(12) United States Patent
Malwitz et al.

(10) Patent No.: US 6,593,386 B1
(45) Date of Patent: Jul. 15, 2003

(54) COMPITABLE LINEAR AND BRANCHED ETHYLENIC POLYMERS AND FOAMS THEREFROM

(75) Inventors: Nelson E. Malwitz, Brookfield, CT (US); Natarajan S. Ramesh, Danbury, CT (US); Shau-Tarng Lee, Oakland, NJ (US)

(73) Assignee: Sealed Air Corporation (U.S.), Saddle Brook, NJ (US)

( * ) Notice: Subject to any disclaimer, the term of this patent is extended or adjusted under 35 U.S.C. 154(b) by 0 days.

(21) Appl. No.: 09/394,723

(22) Filed: Sep. 13, 1999

(51) Int. Cl.[7] .................. C08F 210/00; C08F 236/04
(52) U.S. Cl. .................. 521/134; 521/142; 521/143; 521/144; 521/148; 525/191; 525/207; 525/220; 525/221; 525/227; 525/232; 525/238; 525/240; 525/241
(58) Field of Search .................. 521/134, 142, 521/143, 144, 148; 525/191, 207, 220, 221, 227, 232, 238, 240, 241

(56) References Cited

U.S. PATENT DOCUMENTS

| | | |
|---|---|---|
| 3,563,870 A | 2/1971 | Tung et al. |
| 3,856,719 A | 12/1974 | Miyamoto et al. |
| 4,186,068 A | 1/1980 | Rubens |
| 4,246,211 A | 1/1981 | Kühnel |
| 4,255,372 A | 3/1981 | Kühnel et al. |
| 4,387,169 A | 6/1983 | Zabrocki et al. |
| 4,510,031 A | 4/1985 | Matsumura et al. |
| 4,525,257 A | 6/1985 | Kurtz et al. |
| 4,554,293 A | 11/1985 | Park |
| 4,569,950 A | 2/1986 | Hoshi et al. |
| 4,586,995 A | 5/1986 | Randall et al. |
| 4,598,128 A | 7/1986 | Randall et al. |
| 4,738,810 A | 4/1988 | Cheng-Shiang |
| 5,439,949 A | 8/1995 | Lucas et al. |
| 5,462,794 A | 10/1995 | Lindemann et al. |
| 5,508,319 A | 4/1996 | DeNicola, Jr. et al. |
| 5,552,104 A | 9/1996 | DeNicola, Jr. et al. |
| 5,554,668 A | 9/1996 | Scheve et al. |
| 5,589,519 A | 12/1996 | Knaus |
| 5,605,660 A | 2/1997 | Buongiorno et al. |

FOREIGN PATENT DOCUMENTS

| | | |
|---|---|---|
| EP | 0702032 A2 | 3/1996 |
| GB | 2 019 412 A | 10/1979 |
| JP | 61-113627 | 5/1986 |
| WO | WO 96/27485 | 9/1996 |

OTHER PUBLICATIONS

U.S. patent application Ser. No. 09/219,104, Lee et al.

Primary Examiner—Nathan M. Nutter
(74) Attorney, Agent, or Firm—Alston & Bird LLP

(57) ABSTRACT

An expanded cellular ethylenic polymer product is provided from an irradiated, noncross-linked linear ethylenic polymer. Linear ethylenic polymers can be irradiated at ambient conditions sufficient to introduce branching in the polymer in the absence of detectable cross-linking as indicated by the absence of gels. The irradiated linear ethylenic polymer is compatible with highly branched low density polyethylene and, when mixed therewith, produces a resin having a single broad based melting temperature range as determined by direct scanning calorimetry, which indicates that the polymers in the mixture have similar crystallization behavior suitable for producing low density foams by extrusion foaming. The linear polymers can be obtained from recycled shrink wrap film. Low densities of from 0.7 to less than 4 pcf can be achieved. The foams typically have improved tear resistance as compared to previous products prepared from low density polyethylene, at comparable low densities.

25 Claims, 16 Drawing Sheets

COMPITABLE LINEAR AND BRANCHED ETHYLENIC POLYMERS AND FOAMS THEREFROM

FIELD OF THE INVENTION

This invention relates to expanded cellular products prepared from polyethylene and related polymeric substances.

BACKGROUND OF THE INVENTION

Polyethylene foams prepared from low density polyethylene resins ("LDPE" resins) have been widely accepted for industrial uses. Typically, these foams have light weight and a high degree of uniform enclosed fine cells. LDPE foams can be produced with densities in the range of from about 1 to 30 pcf (16 to 480 kg/cubic meter). Polyethylene foams generally have low water vapor transmission properties and are resistant to mechanical and chemical deterioration. Polyethylene foams are particularly suitable for use in thermal insulation, flotation, cushioning, and packaging. LDPE resins exhibit good melt strength desirable for foaming by conventional methods.

LDPE is made by the so-called "high pressure" process by polymerization of ethylene in the presence a suitable catalyst. LDPE typically has a relatively low density of from about 0.91 g/cc to less than about 0.94 g/cc, typically about 0.92 g/cc. The good melt strength of LDPE is usually attributed to the long-chain and short-chain branches that are distributed along and extend from the polymer backbone. These branches make it more difficult for the individual molecules to slide over each other, which increases the resistance of the molten polymer to stretching during elongation. Increased resistance to stretching is sometimes referred to as "extensional viscosity" and is indicative of the melt strength of the resin and of the ability of a polymer to produce stable, high quality foams of low density. The cell walls formed by nucleation of bubbles during the foaming process offer sufficient resistance to expansion and do not become thin and collapse.

Efforts have been made to produce foams from so-called "linear" polyethylene resins. Generally speaking, linear resins have poor melt strength and are considered unsuitable for making lower density foams. Whereas LDPE is relatively highly branched with widely spaced chains and can be compared to dead tree branches piled together, linear resins are characterized by long, straight chains with less branching and so the molecules are more closely aligned in the manner of carefully folded rope.

Polyethylene resins become more difficult to foam as density, and linearity, increase. For example, unlike LDPE, high density polyethylene ("HDPE)" is produced in a low pressure process and has a relatively high density of from about 0.94 g/cc to 0.96 g/cc. HDPE molecules are among the most linear of the polyethylenes and have a small, controlled number of short-chain branches and normally have essentially no long chain branching. HDPE usually has a higher degree of crystallinity than LDPE and is physically a stiffer, stronger substance than LDPE. HDPE is typically about 70% crystalline at room temperature while LDPE may be as low as about 30 to 45% crystalline. HDPE has a higher flexural modulus and increased thermal stability as compared to LDPE as indicated in part by its higher melting point, and these properties would be useful in expanded cellular products. However, the individual molecules in an HDPE melt can slide over each other easily, and thus HDPE generally exhibits poor melt strength and low extensional viscosity. When HDPE polymers are used in foaming processes, these drawbacks frequently result in a large faction of open cells, foam collapse, and process instability. The cell walls of the HDPE foam normally do not have sufficient resistance to expansion and become thin and collapse.

Mixing branched and linear resins has been attempted in the production of extruded foams and other products, including films. Unlike films, which can be produced from such a mixture, foams require a uniform crystallization of the polymer molecules upon cooling of the expanded resin. The different crystallization characteristics of linear and branched polyethylene resins in physical admixture typically produce foams having large voids.

There are a large number of variables that impact whether a given resin is useful for foam production, including melt index, extensional viscosity, the presence of a cross-linking agent, and other parameters. Good quality foams have been made in which linear polyethylenes are a component under certain circumstances. For example, a cross-linking agent can be activated after extrusion to assist the foam is holding its extruded shape.

Many methods in the art employ cross-linked polyethylenes in the foaming process. Cross-linking enables the extruded foam to retain its shape. For example, HDPE resin can be extruded to the desired shape, cross-linked, and then expanded, normally by a chemical blowing agent that is activated after extrusion and cross-linking in a process called the "two stage process." The resin is extruded prior to cross-linking because the shape of the product is fixed after cross-linking and cross-linking strengthens the resin to withstand expansion by a blowing agent. The two-stage process is in contrast to single stage extrusion foaming, in which a physical blowing agent, including, for example, a volatile organic compound, is mixed under pressure with a molten LDPE resin and then the mixture is extruded into a zone of lower pressure so that the blowing agent expands upon extrusion to produce the foam.

Cross-linking can lead to gelation of the ethylene polymers, which are undesirable localized concentrations of polymer more highly cross-linked than the surrounding areas, and can decrease the melt extensibility of the polymers. As a result, foams made with cross-linked HDPE generally have relatively high density, which is undesirable in many applications.

Methods have also been proposed for increasing long chain branching in the absence of cross-linking, typically by application of radiation. These methods can require steps that increase the complexity of processing the polymer. For example, U.S. Pat. No. 5,508,319 describes a process for improving strain hardening elongational viscosity in linear polyethylene polymers such as HDPE and LLDPE in the absence of cross-linking. The polyethylene is irradiated with high energy ionizing radiation at a radiation absorbed dose of 2.0 megarads or less in an environment having an oxygen content of less than 15% by volume. The irradiated polyethylene is maintained in the environment for a period of time and is then treated to deactivate the free radicals present in the irradiated material. The resulting ethylene polymer is said to have a substantial amount of long chain branches without cross-linking and to exhibit improved melt strength and elongational viscosity.

U.S. Pat. No. 4,598,128 describes a method for making a polyethylene composition having enhanced temperature sensitivity and high low-shear viscosity. The composition is a blend of a linear polyethylene and a long chain Y-branched polyethylene. The Y-branched polyethylene is prepared by irradiating a polymer comprising molecules having at least one vinyl end group per molecule under non-gelling conditions in the absence of oxygen. It is disclosed that the vinyl end group can be created by heating an ethylene polymer under non-gelling, non-oxidizing conditions. The irradiation process is purported not to cause cross-linking.

Mobil Oil Company has recently marketed a group of HDPE resins designated as the HFE-03X series that are said to have sufficient melt strength to produce stable foams. While not wishing to be bound by theory, the Mobil resin is believed to be a "reactor" resin that is a linear resin, but is produced with some degree of branching during the polymerization process that is favorable for producing a foam. The Mobil HFE-03X series resins are among the highest melt strength high density polyethylene resins available and have among the highest extensional viscosities available. However, stable lower density foams comparable in density to foams that can be made from LDPE, are not believed to have been achieved with these resins.

It would be desirable to produce stable, closed cell polyethylene foams of the lowest possible density from linear polyethylene resins in the absence of the drawbacks and disadvantages of complex processing steps and special environments and to increase the available options for producing high quality foams.

SUMMARY OF THE INVENTION

The invention is based on the recognition that linear ethylenic polymer resins can be produced that are compatible with highly branched low density polyethylene resins and can be admixed therewith to produce a resin having uniform crystallization behavior necessary to produce stable closed cell foams of the lowest possible density. A single melting temperature region can be observed for an intimate admixture of linear and branched resins, as opposed to distinct melting regions, which is indicative of uniform crystallization behavior. Quality closed cell foams, having about 80% or more of the cells closed, can be produced at low density in the range of from about 0.7 to less than 8 pcf (11 to 128 kg/cubic meter), and typically in the range of from about 0.7 to less than 4 pcf (11 to 64 kg/cubic meter). Foams can be prepared in the absence of branched polyethylene having a density as low as 2 pcf (32 kg/cubic meter). Scrap materials can be recycled and used to prepare these foams.

Foams prepared from irradiated linear resins and irradiated linear resins blended with LDPE, in accordance with the invention, can exhibit higher flexural modulus, stiffness, and tear strength for a given density than do foams normally obtainable from LDPE alone at the same density. Foams from linear low density polyethylene (LLDPE) resin show more balanced tear resistance in the machine and cross directions than has previously been achieved. Temperature stability is normally improved.

Improvements in physical properties of the foam are somewhat proportional to the amount of conventional LDPE in the blend. For example, up to 50% improvement in flexural modulus, which is a measure of the stiffness of the foam, can be achieved with as much as 40% of conventional LDPE in a blend with LLDPE. However, it should be recognized that conventional LDPE can be used in the blend in greater or lesser amounts, as desired, to optimize particular properties depending on the available resins, economic considerations, the intended use of the foam, and other factors.

The linear ethylenic resins useful in the practice of the invention should have a starting melt index of at least about 0.3 to 1 and are slightly irradiated in the absence of detectable cross-linking and in the absence special processing conditions. While not wishing to be bound by theory, it is believed that irradiation increases the branching in the linear resins so that when these resins are mixed with branched low density polyethylene (LDPE), then the branches become entangled and both temporary and permanent bonds are formed at the molecular level. Scrap shrink wrap film, which is normally a multilayer film and can include layers of irradiated resin, can be recycled for use in admixture with LDPE, up to about 60% by weight of the combined resins, to produce low density expanded cellular products at favorable economic conditions. Foams having enhanced or at least equivalent properties can be produced at lower cost.

Linear polymer structures suitable for irradiation in accordance with the invention include those polyethylenes normally considered in the art to be linear. It should be recognized that "linear" in the art and as used herein normally means that the ethylenic polymer may exhibit some degree of branching, usually introduced by comonomers or oligomers, although far less than "branched" low density polyethylene. For example, high pressure low density polyethylene, which is a highly branched structure, contains a relatively large number of both short and long chain branches, typically from about 10 to 30 per 1,000 carbon atoms.

The linear ethylenic polymers useful in the practice of the invention can be homopolymers or copolymers of ethylene with the alkyl derivatives of ethylene, which are also called alpha-olefins. These alpha-olefins usually have from about 3 to 20 carbon atoms in the chain and are added in relatively small amounts to modify structure, density, and crystallinity by introducing controlled branching and thereby disrupting the packing of the molecular chains. Additional linear ethylenic polymers suitable for foam production in accordance with the invention include copolymers and terpolymers of ethylene monomer or oligomer copolymerized or block polymerized with up to about 30% of generally bulky monomers. These monomers are usually selected from the group consisting of vinyl acetate; methyl methacrylate; maleic anhydride; acrylonitrile; alpha-olefins including propylene, butylene, and methyl pentene; isoprene; styrene; acrylic acid; and ionic salts of acrylic acid (ionomers). These various linear ethylenic polymers, copolymers, and terpolymers can be used alone or in admixture and as blends with conventional, highly branched low density polyethylene (LDPE).

The foams of the invention are prepared from linear resins that have been irradiated to reduce their melt index by at least about 20%. Extensional viscosity is increased by at least about 200% in the absence of cross-linking, complex processing steps, and special environments. Extensional viscosity can be increased above 250%, and typically by 350 to 450%. No reduction of oxygen is required. No free radical deactivation step is required. For example, high density polyethylene (HDPE) and linear low density polyethylene (LLDPE) resins treated in accordance with the invention can have extensional viscosity prior to expansion of from about $2 \times 10^6$ to $1 \times 10^7$ poise at 154° C. for HDPE and at 140° C. for LLDPE polymer at an extensional rate of 2 sec$^{-1}$ using the Cogswell extensional viscosity technique mentioned in his textbook *Polymer Melt Rheology* by F. N. Cogswell, Woodhead Publishing Limited, Cambridge, England (1994). Linear resins having an extensional viscosity of from about $3.5 \times 10^6$ to $4.5 \times 10^6$ poise are somewhat more typical at the temperatures recited above.

The linear resins can be irradiated in air at ambient conditions of temperature and pressure and in the absence of detectable cross-linking, either before or after mixing with LDPE, if LDPE is used. The radiation dosage should be less than that threshold value that induces cross-linking. For example, the resin can be irradiated at 2.77 Mrads (megarads) at an ambient temperature of 72° F. for about 40 to 45 seconds. However, it should be recognized that the radiation dosage is temperature and time dependent and so it is not possible to meaningfully set forth radiation dosages in the absence of a consideration of the conditions at which the radiation is applied. Normally, however, the radiation dosage will be from about 0.01 to about 4.0 Mrads at room temperature and pressure, for convenience, for a time sufficient to produce resins that can be expanded to a stable low density of less than about 8 pcf and in the absence of detectable cross-linking of the resin.

The resins treated in accordance with the invention are suitable for the wide variety of foaming processes known in the art, including, but not limited to, conventional extrusion foaming in which a blowing agent is mixed with molten resin under pressure and then extruded through a forming die into a zone of reduced pressure. A large fraction of uniform closed cells are formed, at least about 80% of the cells, and the foam is stable at low density. Other conventional methods for preparing polyethylene foams should also be useful, including, for example, two-stage expansion processes in which chemical agents are incorporated into the polyethylene resin that are capable of activation to generate a blowing agent in situ and thereby expand the resin to form a foam.

Thus, the invention provides compatibility between linear polyethylene polymers and highly branched low density polyethylene. A resin can be produced from an admixture of the two that exhibits a single melting range. The invention also provides a simple and cost effective method for making foams from various linear ethylenic resins and blends thereof and with low density polyethylene. Moreover, the expanded cellular products can be expected to exhibit improved flexural modulus, stiffness, tear resistance, tensile strength, temperature resistance, and melt strength at low densities. The foams of the invention have enhanced performance in a broad range of applications, including packaging, automotive, and recreational applications. Of primary benefit, scrap shrink film and the like can be used to economically produce very low density foams through recycling. Densities of from 0.7 to less than 4 pcf (11 to 64 kg/cubic meter), comparable to LDPE foams, can be achieved.

BRIEF DESCRIPTION OF THE DRAWINGS

Some of the objects and advantages of the invention having been stated, others will appear in connection with the accompanying graphical representations of comparative data, in which:

FIGS. 5 through 17 show melting points of various HDPE, LLDPE; and LDPE resins and blends thereof and are plots of temperature in degrees Centigrade against heat flow in which the data was obtained by differential scanning calorimetry ("DSC"), and in which:

FIG. 5 shows the melting point of conventional LDPE centered around 108° C.;

FIG. 6 shows the melting point of Mobil HFE-034 HDPE resin centered around 131° C,;

FIG. 7 shows the two different melting point ranges obtained for a blend of conventional LDPE and HDPE irradiated in accordance with the invention at 30% by weight of the resin of HDPE;

FIGS. 8 through 11 show a single melting point range shifting with concentration of irradiated HDPE in a broad DSC peak for blends of LDPE and irradiated HDPE prepared in accordance with the invention and at concentrations of irradiated HDPE of 10% (FIG. 8), 70% (FIG. 9), 40% (FIG. 10), and 50% (FIG. 11) by weight of the resin;

FIG. 12 shows the melting point for conventional LLDPE centered around 124° C.;

FIGS. 13 and 14 show a single melting point range shifting with concentration of irradiated LLDPE in a broad DSC peak for blends of LDPE and irradiated LLDPE prepared in accordance with the invention and at concentrations of irradiated LLDPE of 10% (FIG. 13) and 50% (FIG. 14) by weight of the resin; and FIGS. 15 and 16 show a single melting point range shifting with concentration of a resin from recycled shrink wrap film of irradiated LLDPE and ethylene vinyl acetate (EVA) in a broad DSC peak for blends of LDPE and the recycled film resin prepared in accordance with the invention and at concentrations of irradiated film resin of 10% (FIG. 15) and 30% (FIG. 16) by weight of the resin.

DETAILED DESCRIPTION OF THE INVENTION

Figure 1:
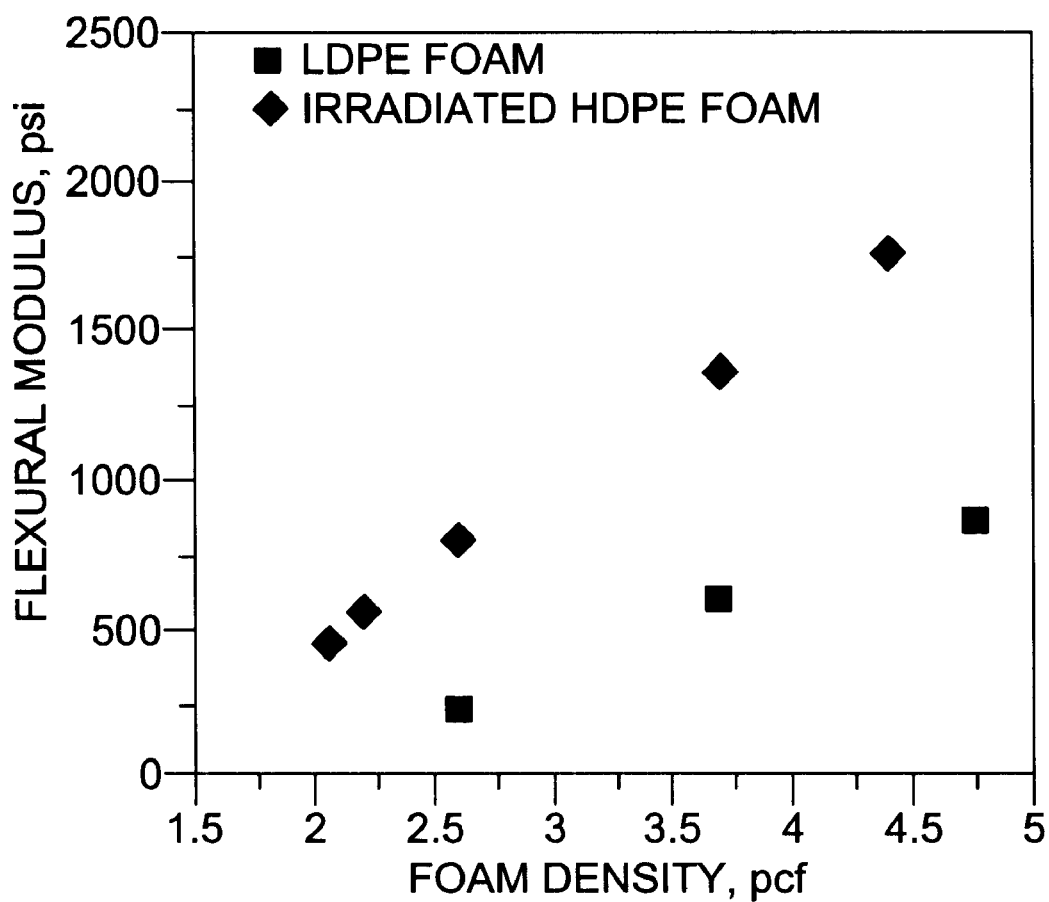
FIG. 1 is a plot of flexural modulus in pounds per square inch against foam density in pounds per cubic foot and compares conventional foam from branched low density polyethylene (LDPE) with foam from linear high density polyethylene resins (HDPE) that have been irradiated in accordance with the invention.

The resistance offered by a polymer when stretched is denoted as the extensional viscosity. As a foam is expanded, nucleated bubbles grow rapidly. The polymer at the cell wall is subjected to free surface extensional flow. Both the rate of bubble expansion and cell uniformity depends on the resistance offered by the polymer when stretched. This phenomenon has been described in the textbook *Polymer Melt Rheology* by F. N. Cogswell, Woodhead Publishing Limited, Cambridge, England (1994).

Melt strength for foam processing can be explained in terms of extensional viscosity behavior by a variety of experimental techniques described in the literature. Several techniques are provided in Chapter 7 of the textbook *Rheology* by C. W. Macosko, Wiley—VCH Publishers, New York (1994) and in a paper published by Nelson E. Malwitz and N. S. Ramesh in the Antec 99 Conference Proceedings at pages 1177 through 1182 (1999) under the title "Predicting Pressure Drop in Mixed Shear and Extensional Flow Using Converging Cone Capillary Rheology." Tension, lubricated compression, fiber spinning, bubble collapse, and entrance pressure drop methods are examples of reported techniques used to evaluate extensional viscosity behavior and melt strength.

Extensional viscosity provides a parameter for detecting the presence of long chain branches. Suitably high extensional viscosity is thought to be primarily responsible for enhanced foamability and enhanced melt strength for foamable polymers. In connection with the invention, a standard published technique known as the entrance pressure drop method was used to determine the extensional viscosity of resins modified in accordance with the invention. The entrance pressure drop method measures the tensile resistance to extension that occurs at the entrance of a capillary. The apparent extensional viscosity and extensional rate are calculated based on Cogswell's derived equations published in *Polymer Melt Rheology*.

The following Table 1 shows the increase in extensional viscosity for Mobil HFE-034 high density polyethylene resin (HDPE) treated in accordance with the invention. Mobil HFE-034 resin is available from Mobil Oil Company under its HFE-03X series of new high density resins. HFE-034 has a density of about 0.952 g/cc and a melt index of about 2. Generally, the bubble growth process creates strain ranging from between 0.0001 to 5 sec$^{-1}$. A typical strain rate of 2 sec$^{-1}$ is considered an optimum rate for the foam growth process and was the strain rate used in the evaluation for Table 1. However, the qualitative trend of the experimental data does not change at other convenient strain rates when considered for comparison.

TABLE 1

| Resin | Extensional viscosity at 2 sec$^{-1}$ strain rate at 154° C. (poise) | % Increase in extensional viscosity due to branching | Foamability |
|---|---|---|---|
| Mobil HFE-034 At 154° C. | 1 × 10$^6$ | — | Not good. Foam collapsing. |
| Irradiated Mobil HFE-034 at 2.8 Mrad At 154° C. | 3.9 × 10$^6$ | 290%* | Good for making a low density foam |

*percentage increase in extensional viscosity compared to original polymec = (((3.9–1) × 10$^6$)/1 × 10$^6$)100

FIG. 1 shows the flexural modulus data for irradiated 100% HDPE foam. A 90-mm twin screw extruder was used with the standard additives, including talc as a nucleant and glycerol monostearate as a permeation modifier. Isobutane was used as a blowing agent. The melt temperature ranged from 268 to 271° F. (404 to 406° K). The extrusion rate was typically set at 45.4 kg/hr. The extruded foam was in the shape of cylindrical rods.

As graphically demonstrated in FIG. 1, foam produced in accordance with the invention has approximately double the flexural modulus of conventional low density polyethylene foam at comparable density. The foam of the invention has a flexural modulus exceeding at least about 500 to 1,200 psi for foam density of from 1 to 5 pcf, increasingly substantially linearly with density. Flexural modulus of 2,000 psi is achievable at 5 psi. The foams are stiffer and more resistant to bending at the same force than comparable conventional foams. Flexural modulus is a measure of the strength of the foam, and the difference in conventional foams and the foams of the invention are palpable and readily apparent.

Mobil HFE-034 high density polyethylene resin was irradiated in accordance with the invention in air at about 2.77 Mrads at 72° F. for about 40 to 45 seconds to produce the resin that was foamed for use in the preparation of FIG. 1. The irradiated Mobil HFE-034 resin exhibited an increase in extensional viscosity of 410%, from 1×10$^6$ poise to 4.1×10$^6$ poise. Typically, resins of the invention have an extensional viscosity of from about 3.5×10$^6$ to 4.5×10$^6$ poise, which generally is about a 350 to 450% increase in extensional viscosity over the same resin prior to irradiation. Irradiation should be performed to achieve at least about a 200 to 250% increase in extensional viscosity. The range of resins useful in accordance with the invention can have an extensional viscosity of from about 2×10$^6$ to 1×10$^7$ poise at, for example, 154° C. for HDPE and 144° C. for LLDPE at an extensional rate of 2 sec$^{-1}$ using the Cogswell extensional viscosity technique as discussed above.

Other linear homopolymers of ethylene and copolymers or terpolymers of polyethylene in which ethylene is polymerized with a different monomer should also be useful in the practice of the invention. These ethylenic polymers all have in common the ethylene monomer in the backbone. While not wishing to be bound by theory, it is believed that linear resins having a density of from about 0.86 and higher that are modifiable in accordance with the invention normally should have a preexisting relatively high extensional viscosity of at least about 0.8×10$^6$ poise and a melt index of at least 0.3 prior to treatment in accordance with the invention. These values for extensional viscosity may indicate a certain degree of spaced long chain branches in the resins.

Suitable resins are those polyethylenes other than LDPE and copolymers and terpolymers prepared with ethylene monomers and oligomers. These resins include, but are not limited to, the polyethylenes normally considered to be linear, including ethylene homopolymer, the ethylene and alpha-olefin copolymers normally designated as polyethylenes, and the copolymers of ethylene with the bulkier monomers. These resins present the problem of low melt strength and extensional viscosity and previously have been generally regarded as incompatible with LDPE and unsuitable for making stable foams. The polyethylene resins include high density polyethylene (HDPE), ultra-high density polyethylene (UHDPE), linear medium density polyethylene (LMDPE), linear low density polyethylene (LLDPE), very low density polyethylene (VLDPE), ultra-low density polyethylene (ULDPE), metallocene polyethylene (mPE), which is produced from metallocene catalyzed polymerization. The alpha-olefins normally have from 3 to 20 carbon atoms in the chain and include propene, 1-butene, 1-pentene, 1-hexene, 1-octene, methyl pentene, and the like. Also included are various ethlyenic copolymers including, but not limited to, ethylene monomers or oligomers copolymerized or block polymerized with vinyl acetate (ethylene vinyl acetate or EVA); methyl methacrylate; maleic anhydride; acrylonitrile; alpha-olefins including propylene, butylene, methyl pentene; isoprene; styrene; acrylic acid; and ionic salts of acrylic acid (ionomers). These various ethylenic polymers can be used alone, in admixture, and as blends with conventional low density polyethylene (LDPE). All these ethlyenic polymers normally also are considered linear, excluding LDPE, even though they may contain some degree of short and long chain branching.

LLDPE normally means a random copolymer of ethylene and alpha-olefin selected from the group consisting of $C_3$ to $C_{10}$ alpha-olefins having a polymerized alpha-olefin content of about 20% by weight. Examples of suitable alpha-olefin monomers in the LLDPE resin include, but are not limited to, butene, pentene, methyl-pentene, hexene, heptene, octene, and 1,4-butadiene. The LLDPE used in connection with the invention typically will be a copolymer of ethylene and butene.

Ultra-low density polyethylene normally designates linear polymers of density from about 0.86 to 0.88 g/cc. Very low density polyethylene normally designates linear polymers of density from about 0.88 to 0.91 g/cc. Linear low density polyethylene normally designates linear polymers of density from about 0.91 to 0.93 g/cc. Linear medium density polyethylene normally designates linear polymers of density from about 0.93 to 0.94 g/cc. High density polyethylene normally designates linear polymers of density from about 0.94 to 0.96 g/cc. Ultra-high density polyethylene normally designates linear polymers of density greater than about 0.96 g/cc. Metallocene polyethylene normally designates linear polymers having densities of from about 0.86 to 0.95 g/cc (mPE).

Suitable linear polymers have a preexisting relatively high extensional viscosity that is believed to be responsible for the successful treatment of the resin to greatly increase the extensional viscosity. No conditions of an oxygen free or oxygen reduced environment and no free radical deactivation step are necessary in connection with the practice of the invention. While the Mobil resin could be irradiated under special conditions, it is not necessary to do so to produce foams of low density down to about 0.7 pcf. Oxygen can be present in the atmosphere in amounts greater or less than 15%, and it normally is most convenient and economical to irradiate the resin in the presence of air, which typically is about 21% oxygen.

The polymer resin should be uniformly exposed to high energy radiation that uniformly penetrates the polymer mass to ionize the molecular structure and to excite the atomic structure without adversely affecting the atomic nuclei. Irradiation of a linear polyethylene polymer in accordance with the invention can be performed with any suitable type of high energy radiation, including but not limited to electron beams, gamma rays, alpha rays, beta rays, X-rays, high energy neutrons and the like. Examples of the sources of high energy radiation include, but are not limited to, radioactive isotopes, cathode tubes, spent fuel elements from nuclear reactors, linear accelerators, electron generators, and the like. Typically, electron beam radiation will be used.

It should be recognized that small amounts of linear resin that is not irradiated can be included in the resins used in the practice of the invention without adversely impacting the quality of the foam. Typically, these will be high melt strength linear resins.

The irradiation step in accordance with the invention does not cause detectable cross-linking of the linear polyethylene polymer as shown by gel point analysis of foams made from the irradiated linear polyethylene polymer. Gel point analysis indicates that the foam dissolves in decahydronapthalene without detectable gel formation according to ASTM test D-2765. It is believed that the resins for use in the practice of the invention should remain substantially gel free after irradiation, which means that the gel content should be less than about 5%.

The dose and dose rate of the absorbed radiation should be chosen so that long chain branches are introduced without causing any detectable cross-linking and to produce an extensional viscosity of at least about $2 \times 10^6$ to $1 \times 10^7$ poise at previously mentioned experimental conditions. The dose rate should be intense enough to produce the desired increase in extensional viscosity in a reasonable amount of time in the absence of detectable cross-linking. If the dose is too low, then the extensional viscosity may not increase. Long chain branching and an increase in extensional viscosity are thought to contribute to reducing the processing heat usually associated with linear reins and to make the resin more tolerant of increased temperature. However, if the dose is too high, then the exposure is difficult to control and cross-linking may result.

One rad is the quantity of radiation that results in the absorption of 100 ergs of energy per gram of irradiated material. The radiation can be quantitatively measured using a conventional dosimeter. The total radiation dosage should be in the range of from about 1 megarad to about 4 megarads, preferably from about 1 megarad to about 3.5 megarads, and more preferably from about 2 megarads to about 3 megarads. The dose rate can be in the range of from about 1 megarad per minute to about 10 megarads per minute, and preferably from about 2 to 4 megarads per minute.

Some minor degree of effort may be required to determine the dose and dose rate with respect to different types of linear polyethylene polymers, different physical forms of the linear polyethylene polymers, different sources of radiation, and with respect to different environments in which the irradiation is to be conducted. This effort is considered to be well within the capability of one skilled in the art once apprised of the present disclosure.

The polyethylene polymer or copolymer can be in any physical form for irradiation, solid or melt, including, but not limited to, pellets, granules, sheets, film, fine particles, and the like. Typically, the linear polyethylene polymer is in the form of small pellets or fine spherical particles, which promotes uniform irradiation.

The linear polyethylene polymer irradiated in accordance with the invention can be subjected directly to the step of producing foams. Alternatively, the irradiated linear polyethylene polymer can be stored for later use. Shrink wrap films that are irradiated, especially scrap, are useful sources of polymer for the practice of the invention.

All of the foam examples supporting the invention were produced by conventional extrusion foaming techniques using standard blowing agents typically used in connection with polyethylene foam production. As graphically demonstrated in FIG. 2, foams produced in accordance with the invention have improved tear resistance in the machine direction as compared to conventional low density polyethylene foams at comparable densities. The foams of the invention consistently are stronger and resist tearing over a number of trials compared to conventional foam.

Figure 2:
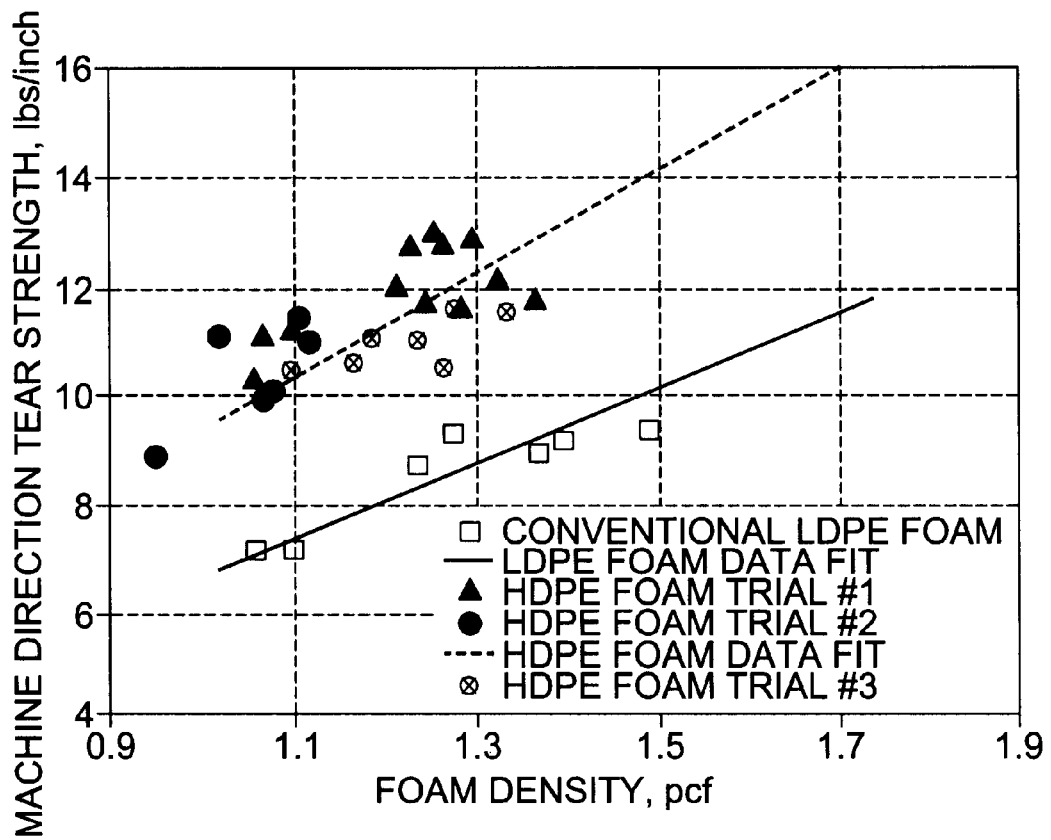
FIG. 2 is a plot of machine direction tear strength in pounds force per inch against foam density in pounds per cubic foot and compares a curve generated for conventional LDPE foam with a curve generated for three foams prepared from a blend of 25% by weight irradiated Mobil HFE-034 HDPE resin treated in accordance with the invention and 75% by weight conventional LDPE.

The LDPE foam used for the comparative examples in FIG. 2 is from the same production run as that used in FIG. 1. FIG. 2 shows the higher tear strength exhibited by HDPE foam over the conventional LDPE foam at about 25% HDPE by weight composition. The HDPE resin used in connection with FIG. 2 is Mobil HFE-034, irradiated as set forth above in connection with FIG. 1. However, in FIG. 2, after the HFE-034 resin was irradiated, then the irradiated resin was mixed with LDPE in an amount of 28% by weight of the irradiated resin and 72% by weight LDPE, which was not irradiated. A tandem extruder was used for the experiment. The output rate was 106.8 kg/hr. The same additive and blowing agent combination mentioned before in Example 1 was used. For the LDPE foam, the melt temperature ranged from 243 to 244° F. (390 to 391° K.). The extruded foam was in the shape of thin sheets. As can be seen, the improvement in tear strength is remarkable despite the relatively high concentration of LDPE.

It should be recognized that, for economic reasons, it typically is desirable to irradiate only the linear resin prior to mixing with LDPE resin. Use of scrap resin that has been previously irradiated for some other purpose is particularly advantageous from an economic standpoint.

Figure 3:
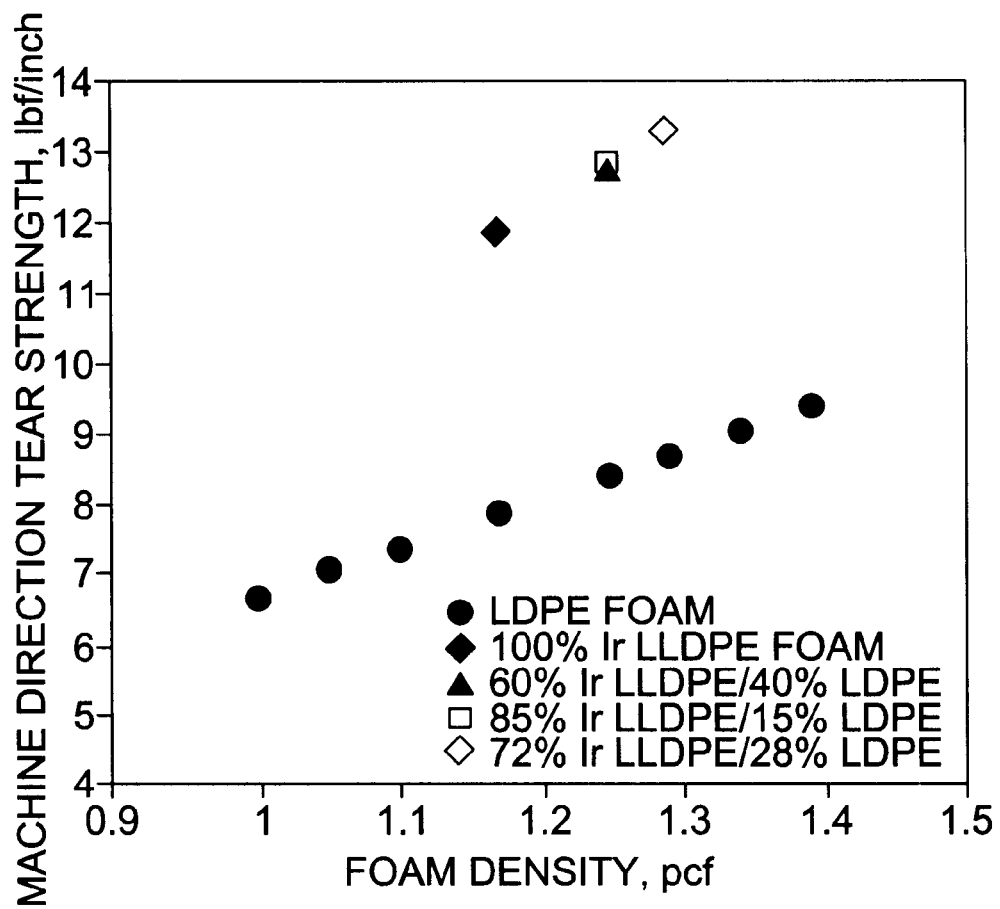
FIG. 3 is a plot of machine direction tear resistance in pounds force per inch against foam density in pounds per cubic foot and compares a curve generated for conventional LDPE foam with a curve generated for four foams prepared from blends of conventional LDPE and LLDPE irradiated in accordance with the invention in which the LLDPE component is present in an amount of from about 60% to 100% by weight.

FIG. 3 graphically demonstrates improvement in tear resistance for foams made in accordance with the invention from LLDPE resin. The LLDPE resin was irradiated at about 2.77 Mrads at 72° F. for about 40 to 45 seconds, as was the HDPE resin in the previous examples. Four foams were prepared by extrusion foaming using conventional gaseous blowing agents and techniques. A 90 mm twin screw extruder was used for the experiments. The output rate was a 36.3 kg/hr. The same nucleating agent and blowing agent as used in previous examples were used. The foams ranged from 100% LLDPE to a blend of 60% by weight irradiated LLDPE and 40% LDPE. Examples were also prepared having 85% LLDPE/15% LDPE and 72% LLDPE/28% LDPE. In all cases, the LLDPE foams and foams from blends of LLDPE and LDPE showed marked improvement in tear resistance in the machine direction. Tear resistance should be 10 to 15 pounds force per square inch for foam densities of from 1 to 1.5 pcf. For example, tear resistance should exceed at least about 8 lbs/in of foam at 1 pcf density to about 16 lbs/in at 2 pcf, increasing linearly with density.

About 60% irradiated LLDPE or HDPE in a blend with 40% LDPE is considered necessary to achieve a 50% improvement in physical properties in the foams produced, compared to conventional LDPE. However, it should be recognized that substantial benefit can be obtained from practice of the invention in connection with blends containing more LDPE. Substantial improvement is shown in foams prepared from a blend of 25% HDPE and 75% LDPE in FIG. 2. Foams of HDPE or of LLDPE or blends thereof, in the absence of LDPE resin, can be produced with density as low as about 2.5 pcf. However, densities as low as about 1 pcf can be achieved by incorporating at least about 75% LDPE in the blend.

It is intended to encompass within the scope of the invention blends that are primarily LDPE, up to about 95% by weight or more, in admixture with the linear ethylenic resins irradiated in accordance with the invention. Blends of the linear resins can be used in any desired ratio. However, recycled film typically should be present at less than or equal to about 60% by weight of the resin.

Figure 4:
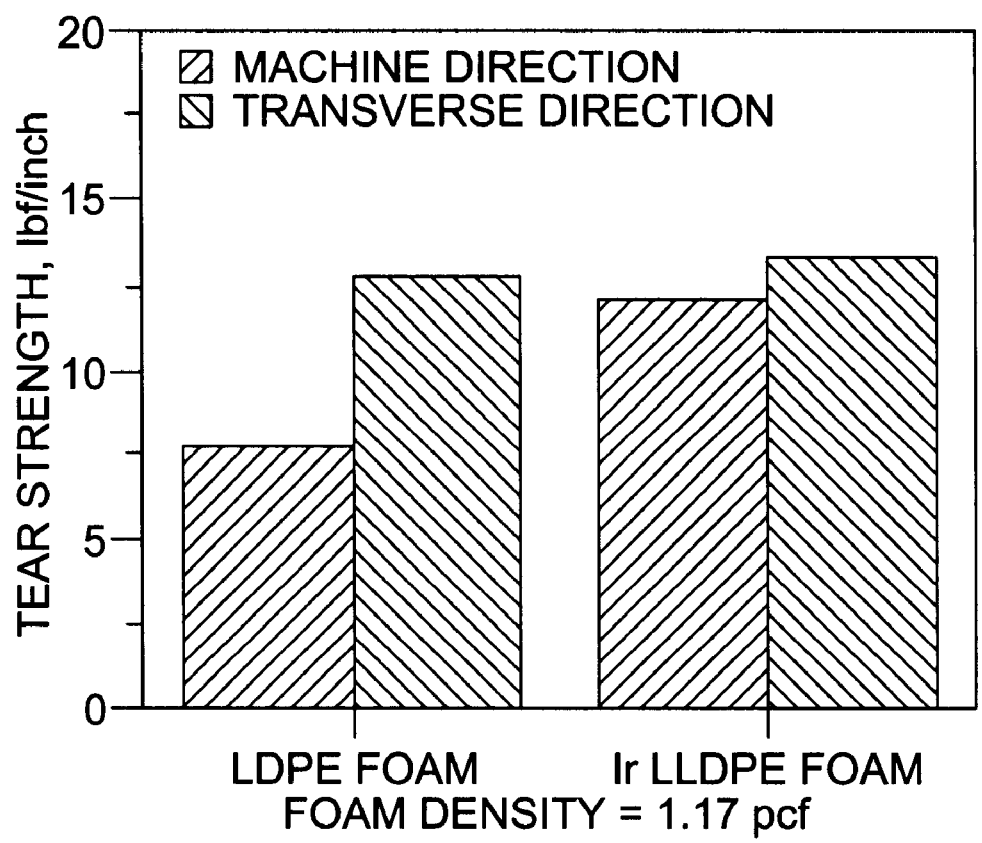
FIG. 4 is a bar graph showing tear resistance in pounds force per inch in the machine and cross directions for conventional LDPE foam and for LLDPE foam prepared in accordance with the invention.

Conventional LDPE foam has a substantial difference in tear resistance in the machine and cross directions and is normally considerably stronger in the cross direction. As graphically illustrated in FIG. 4 for a 100% LDPE foam of density of 1.17 pcf, the difference can be as much as 5 pounds force per inch of foam. However, an example of 100% irradiated LLDPE foam prepared in accordance with the invention not only has markedly improved tear resistance in the machine direction, but has more balanced strength properties in the machine and cross directions. The machine direction tear strength is less than the cross direction tear strength by approximately 1 to 1.5 pounds force per inch of foam, which means that the foam has nearly equal strength in each direction as compared to conventional foam. Normally, tear resistance is 10 to 100% greater than that of comparable conventional LDPE foam.

The thermoplastic resin composition may optionally further contain additives such as stabilizers, antioxidants, plasticizers, coloring agents, flame retardants, and the like.

FIGS. 5 through 16 show melting points for LDPE, HDPE, and LLDPE, and for various blends of LDPE with HDPE, HDPE and LLDPE irradiated in accordance with the invention, and LLDPE from an irradiated shrink wrap film. The plots shown in these figures were all obtained by differential scanning calorimetry, or DSC, in which the temperature and the rate of change of temperature is precisely determined as heat is added to or abstracted from a sample of polymer resin in a controlled constant environment. At phase transitions, as from solid to liquid (melting) or from liquid to solid (crystallization), heat is absorbed by or abstracted from a pure substance at constant temperature, producing a sharp peak. The heat is recorded in Joules per gram of sample (J/g). The scanning rate for all the plots was 10.0 degrees Centigrade per minute and the samples weighed from about 4 to 5 mg each.

However, polymer samples typically have a range of molecular weights present, which is sometimes called polymeric diversity, and the molecular weight is directly related to the melting point. Accordingly, a sample of a single polymer having a relatively low polymeric diversity will still exhibit a somewhat broadened peak due to the range of molecular weights in the sample, with the point shown as the melting point for the nominal molecular weight.

Figure 5:
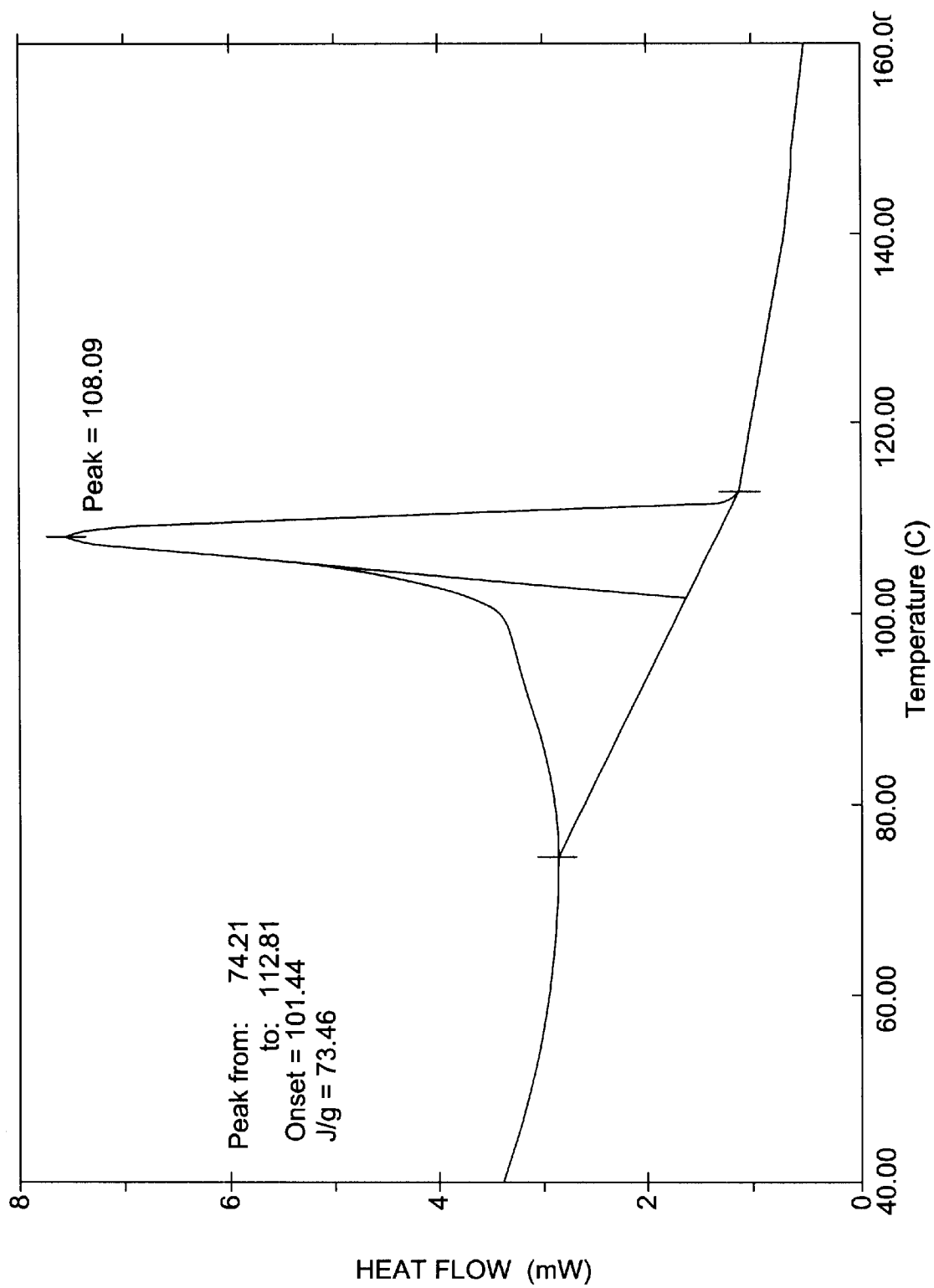
Figure 6:
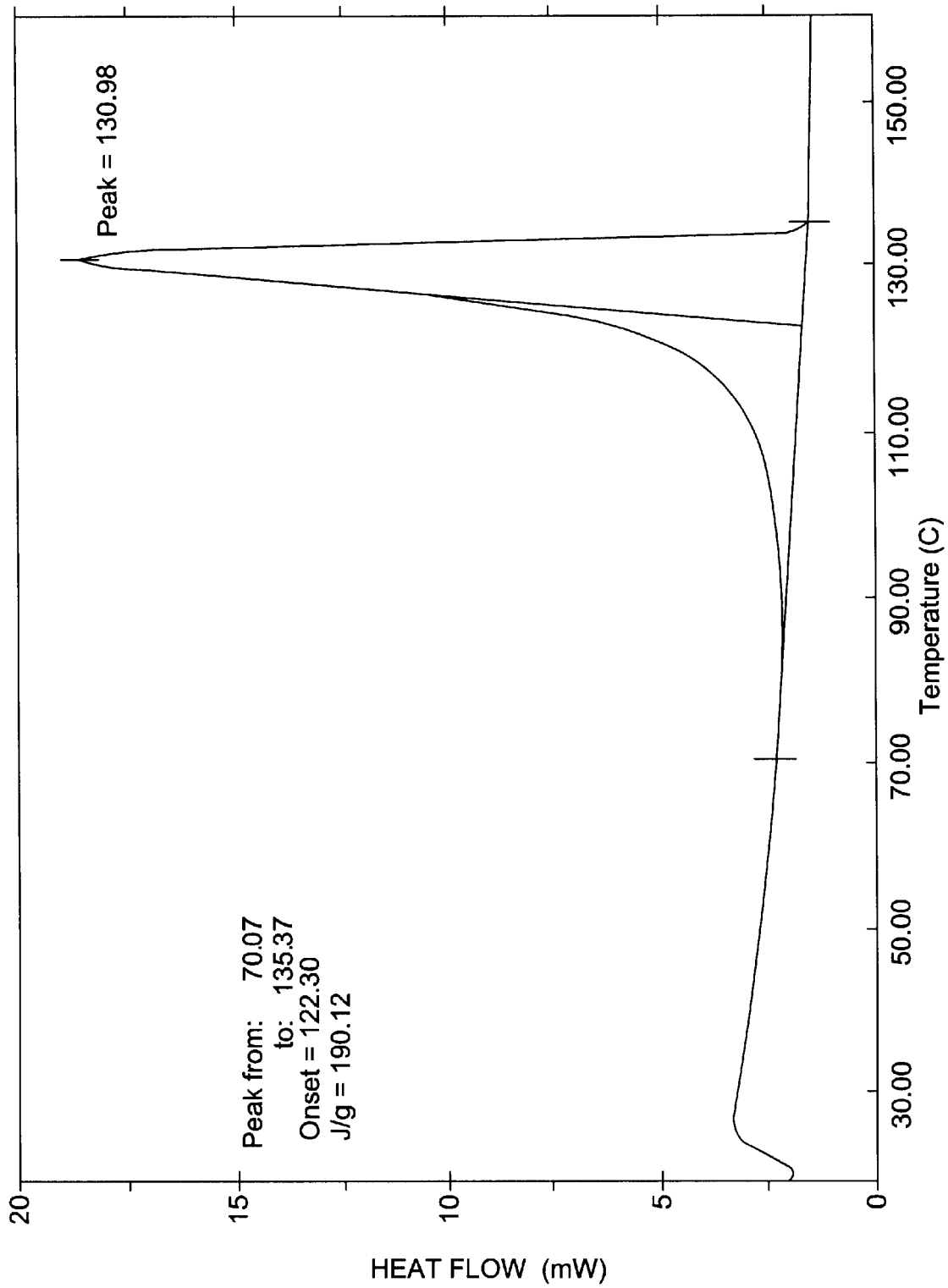
Figure 7:
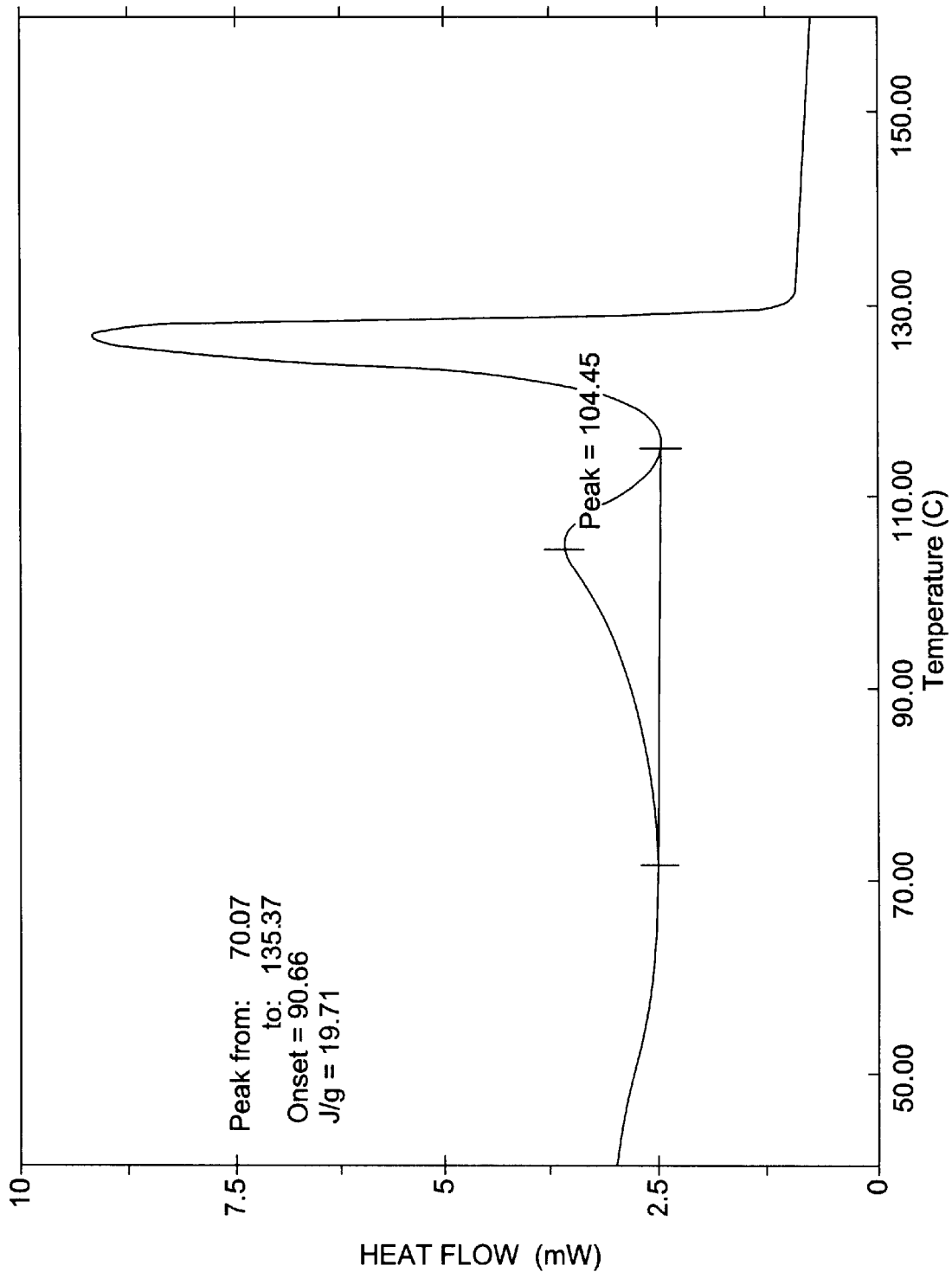
Figure 8:
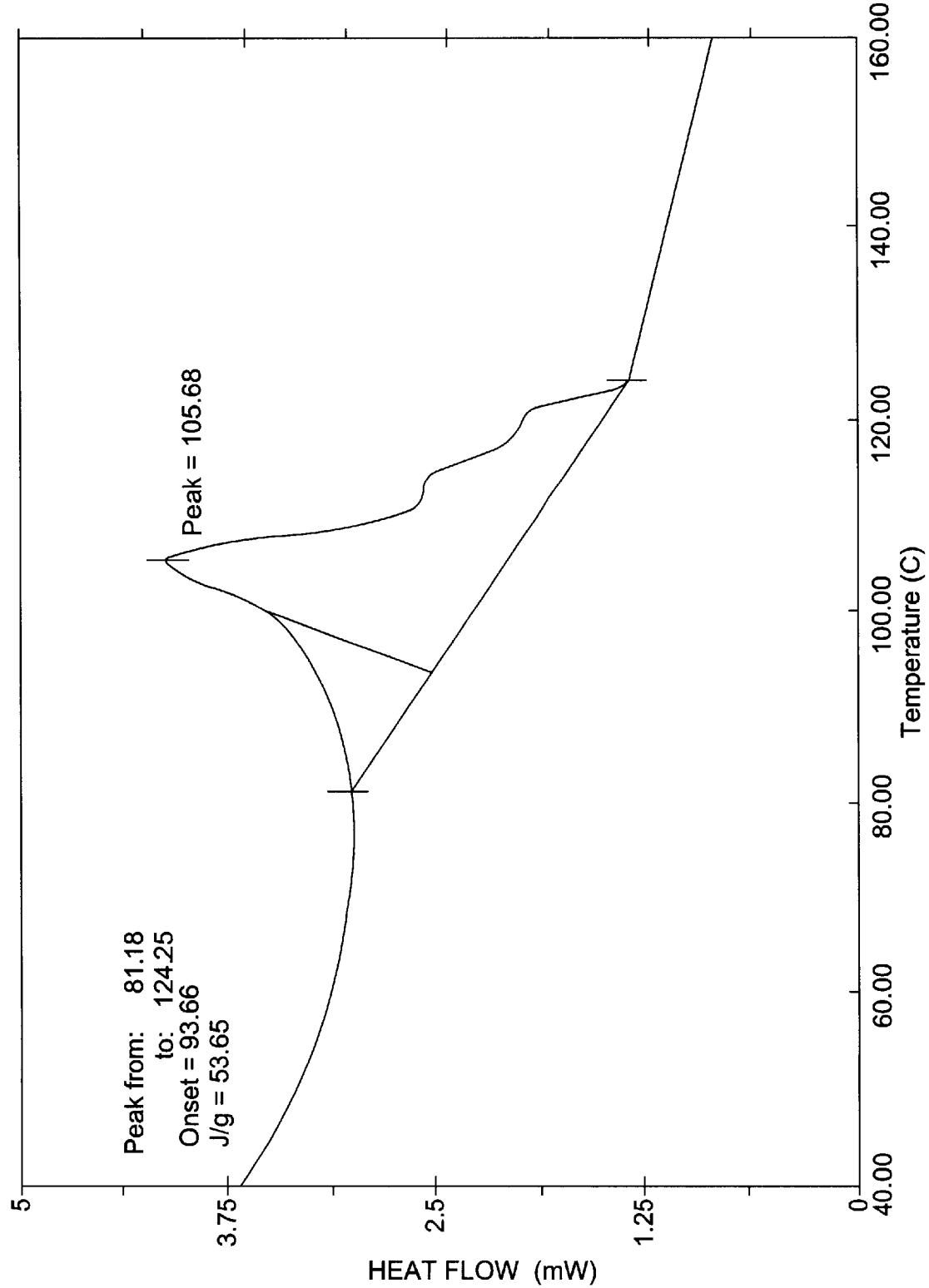
Figure 9:
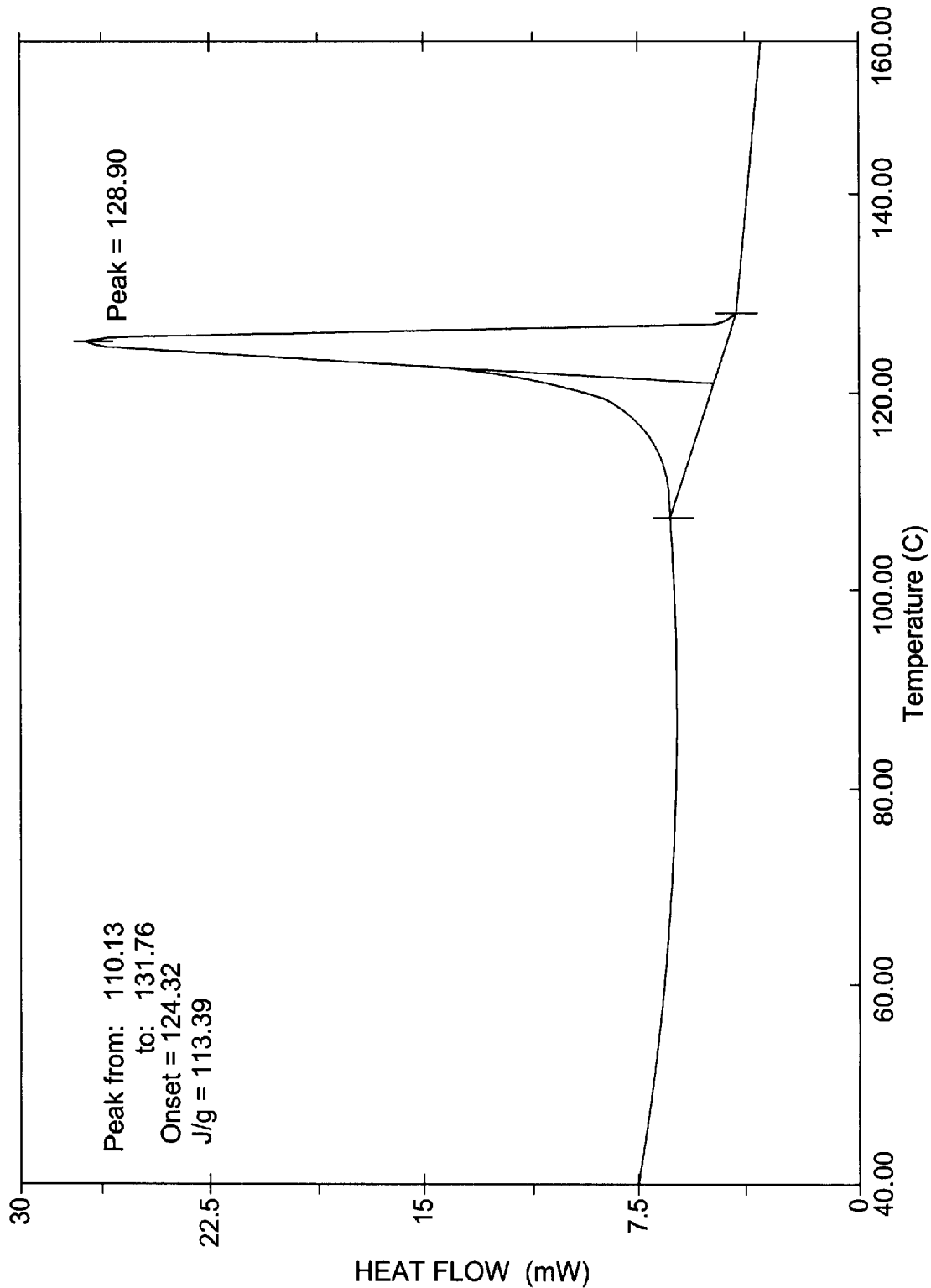
Figure 10:
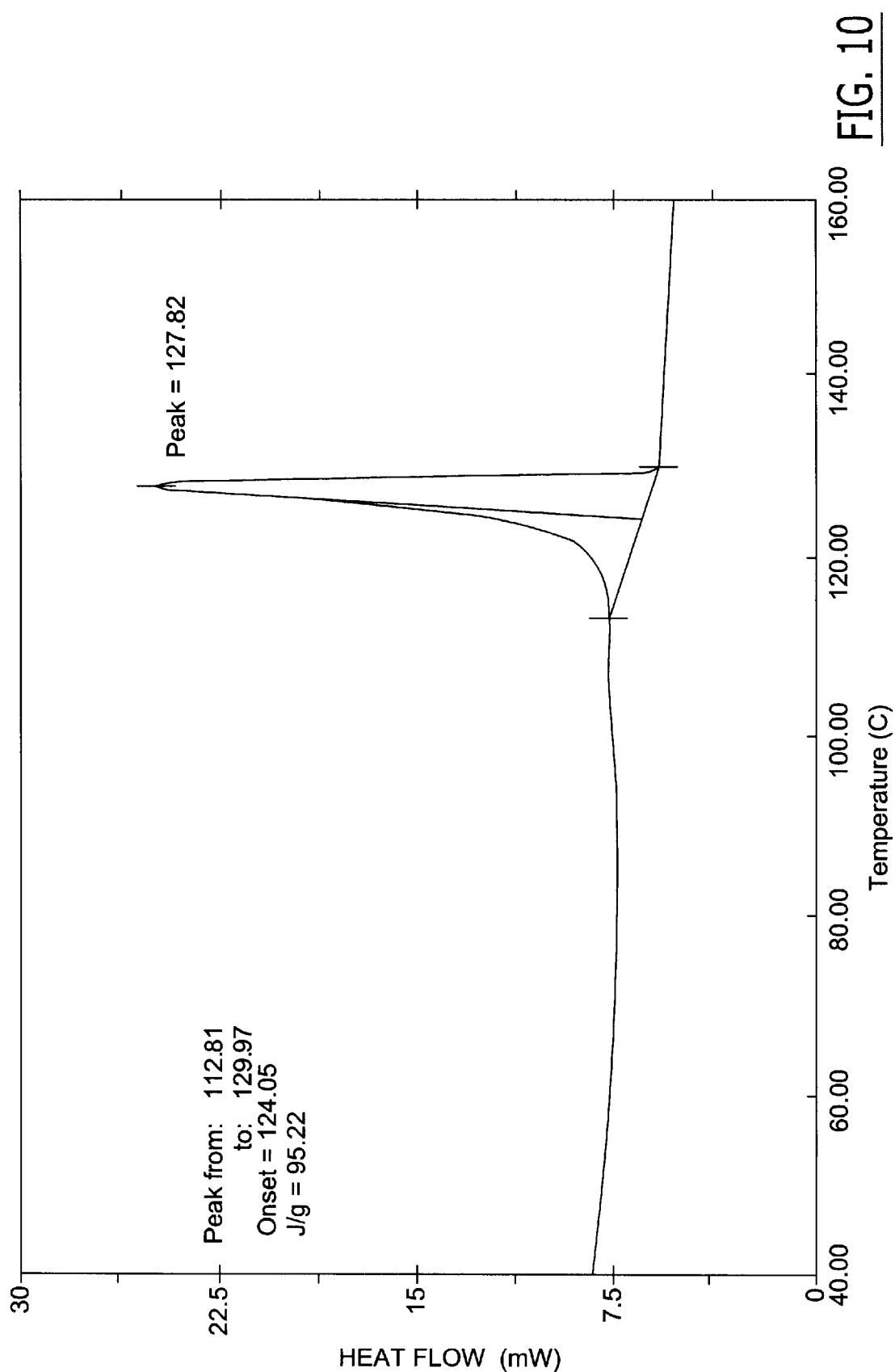
Figure 11:
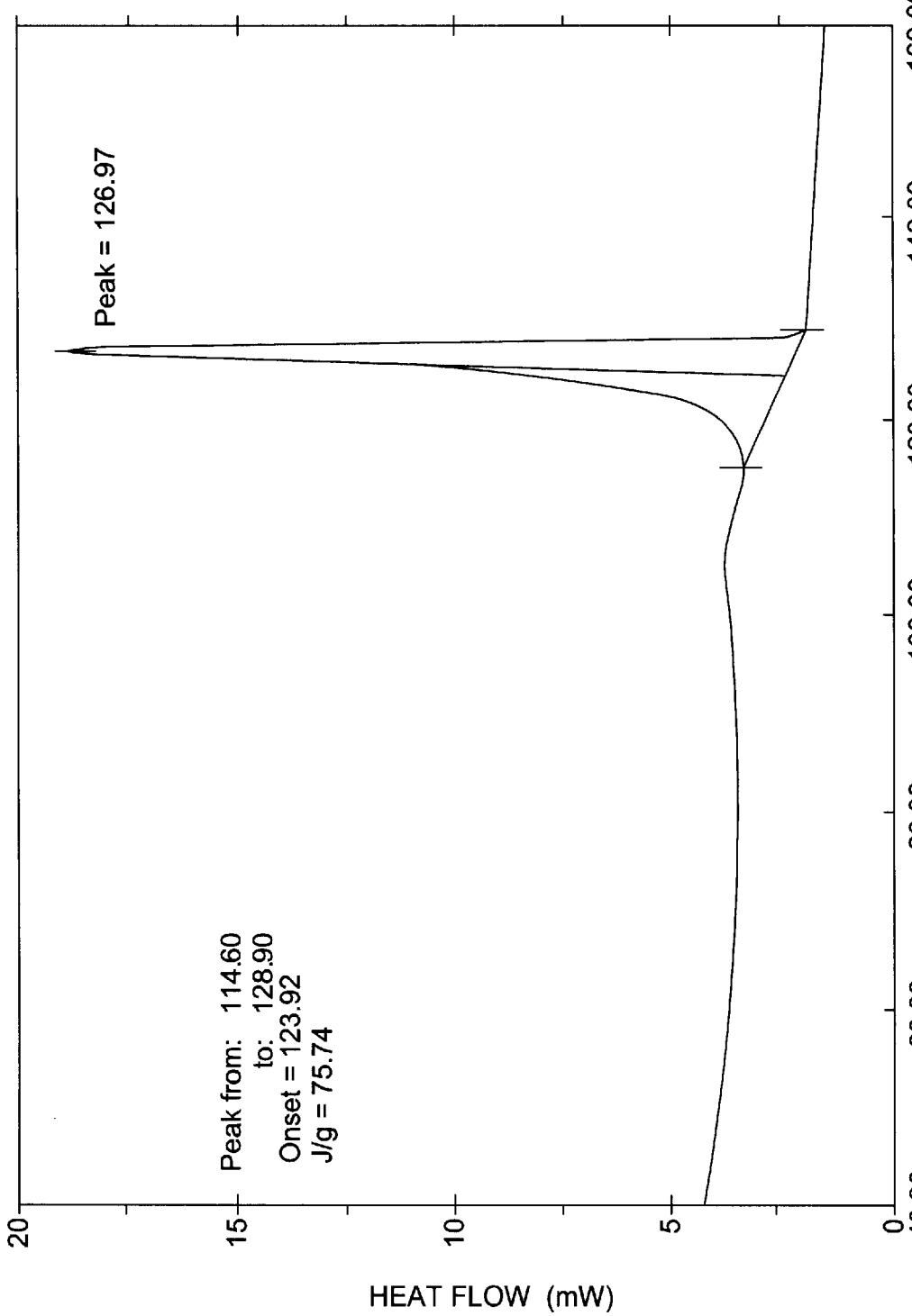

FIG. 5 shows the melting point of a conventional LDPE centered at 108° C. The peak begins at about 74° C. and ends at 113° C. with a relatively sharp increase at about 101° C., indicating relatively typical low polymeric diversity in molecular weight. FIG. 6 shows a DSC plot for Mobil HFE-034 HDPE resin having a somewhat sharp peak centered at about 131° C., starting at about 70° C., increasing gradually to about 122° C., and ending at about 135° C. As is expected, the HDPE has a somewhat higher melting point than LDPE resin. In sharp contrast to FIGS. 5 and 6, FIG. 7 clearly shows two distinct melting points for a mixture of LDPE and HDPE at 30% by weight of the resin of HDPE, one for LDPE centered at about 104° C., and one for HDPE centered at about 125° C. The difference in melting points indicates clearly the difference in crystallization behavior of the two polymers, also indicating that an extruded foam product prepared from the blend of FIG. 7 would likely collapse. However, it should be recognized that a resin blend of the invention including linear resins may show two separate DSC peaks if the scan is taken at a very slow rate. Nevertheless, scanning at a typical rate of about 10° C. per minute for about a 5 mg sample shows but one peak generally and accurately reflects the molecular interaction and uniform crystal formation of blends of the invention.

FIGS. 8 through 11 show DSC plots for various blends of LDPE with HDPE that have been irradiated in accordance with the invention. In each case, a single peak is shown, clearly indicating intimate mixing and blending of the LDPE and HDPE components at the molecular level. The polymer chains of the two species have become entangled and exhibit a single broad peak, indicating a uniform crystallization behavior favorable for foaming, from 10% to 40% by weight of HDPE in the resin. The melting point shifts upward as the concentration of HDPE in the blend is increased. At 10% HDPE (FIG. 8), the peak is centered at 106° C. At 20% HDPE (FIG. 9), the peak is centered at 128° C. At 30% HDPE (FIG. 10), the peak is centered at 127° C. At 40%

HDPE (FIG. 11), the peak is centered at 129° C. The melting point shift is a further indication of the intimate entanglement between the irradiated HDPE an LDPE and the uniform crystallization behavior of the blend.

Figure 12:
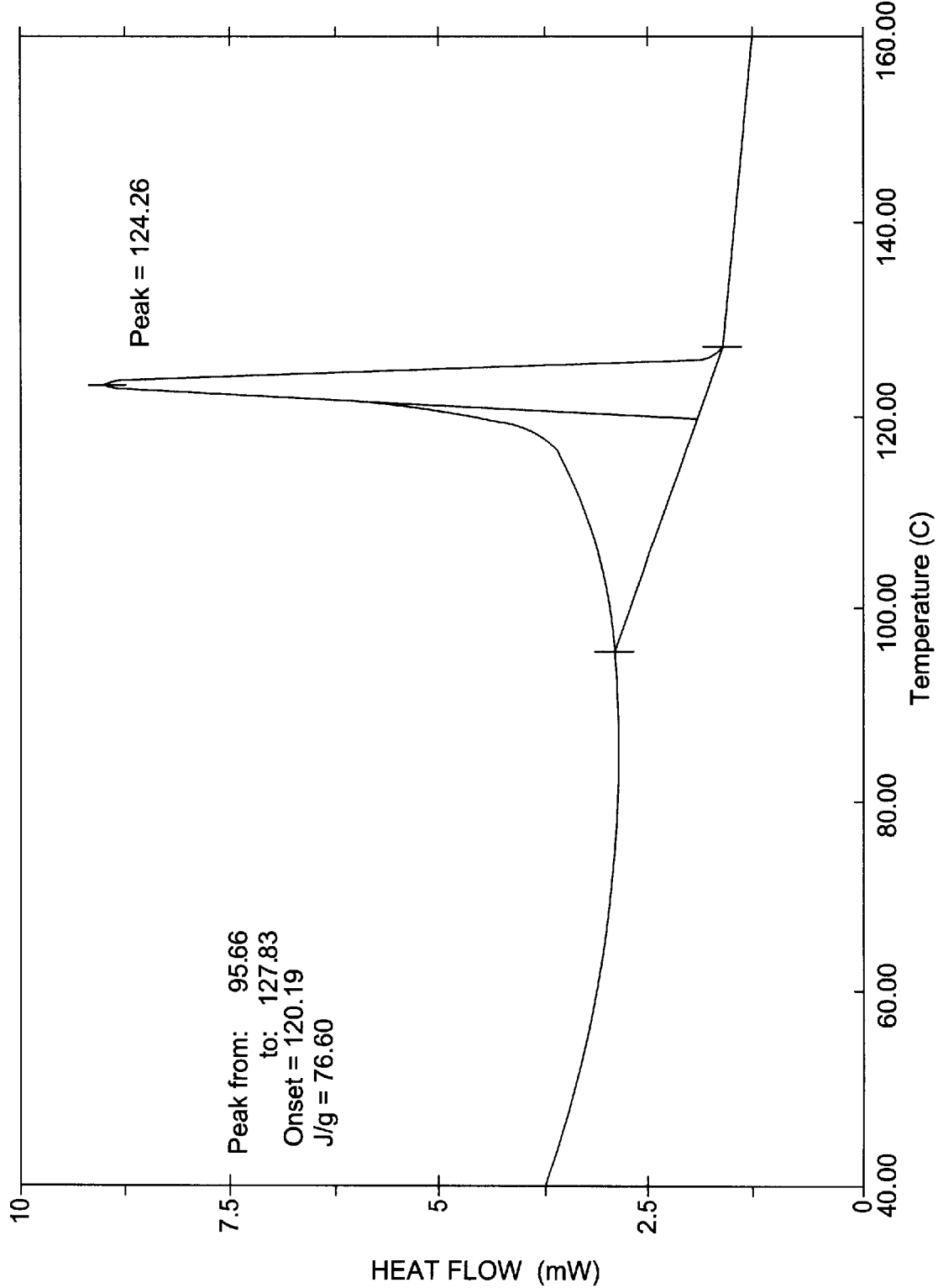
Figure 13:
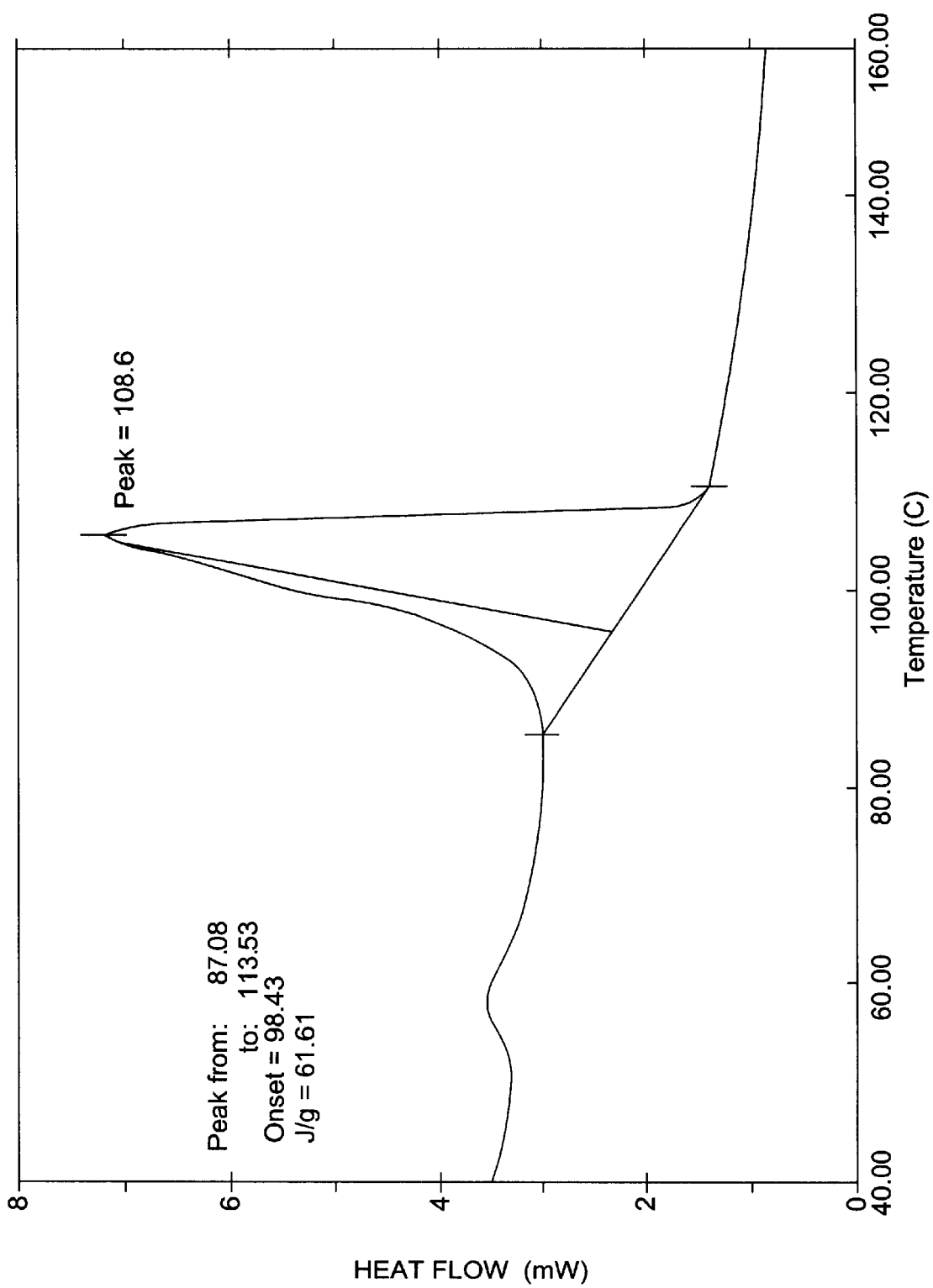
Figure 14:
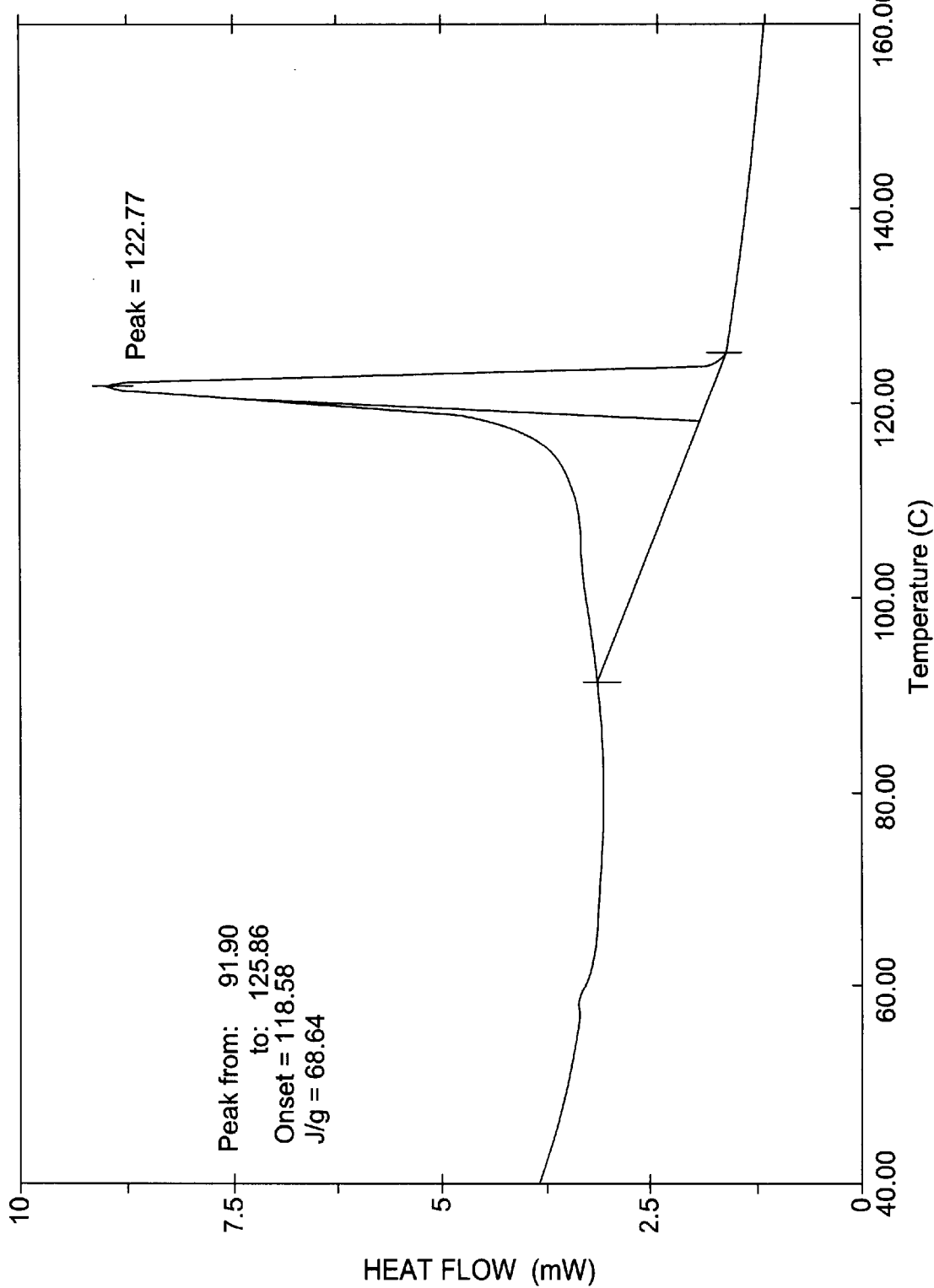

FIG. 12 shows the DSC plot for LLDPE having a melting point centered at about 124° C., which is higher than LDPE, as expected. FIGS. 13 and 14 show DSC plots for blends of LDPE and LLDPE irradiated in accordance with the invention in concentrations of from 10% to 50% by weight of the resin, respectively. The results are similar to those shown in FIGS. 8 through 11 for blends of LDPE and irradiated HDPE, in that a single broad peak that shifts with concentration of LLDPE is shown.

Figure 15:
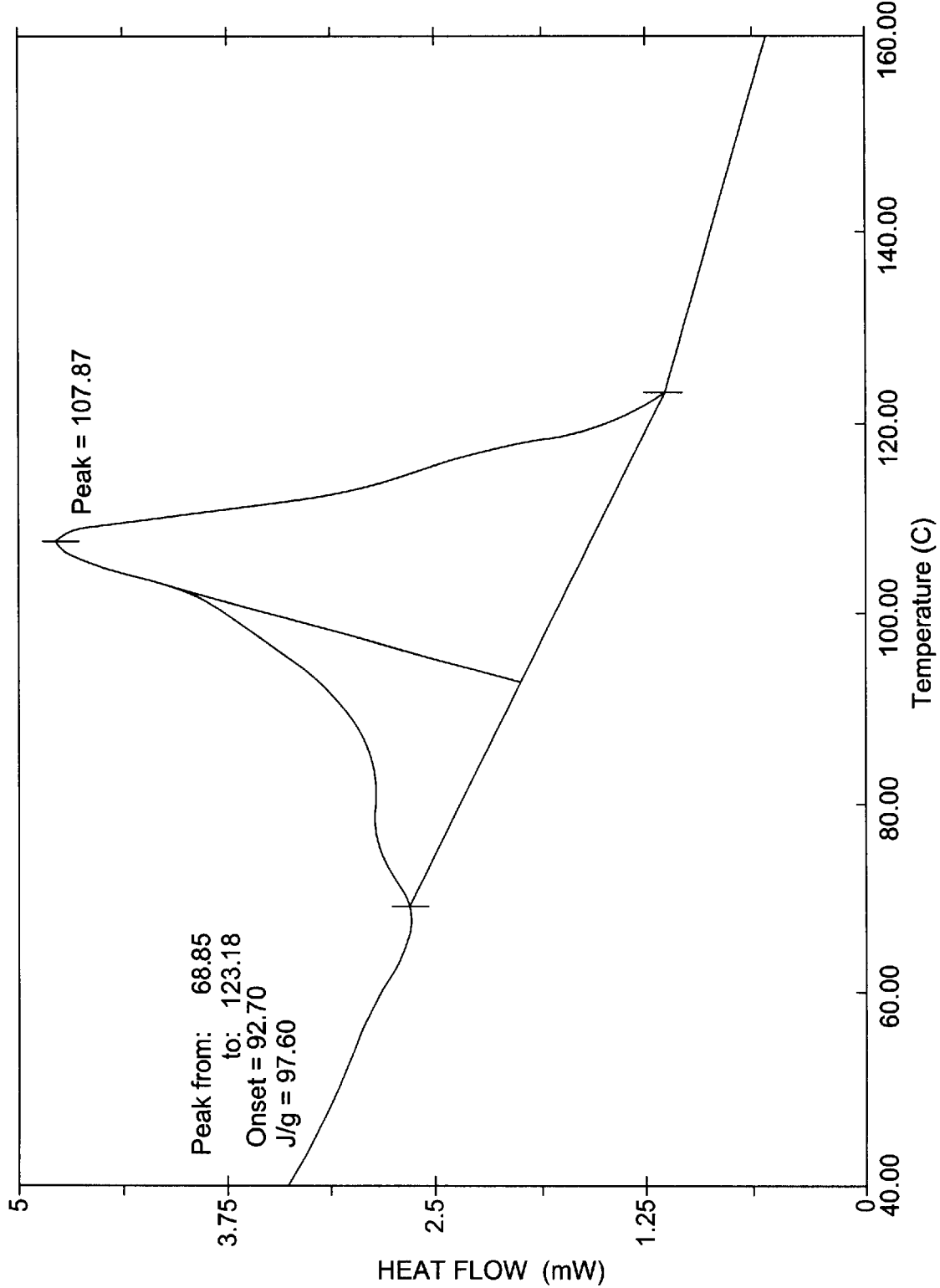

FIGS. 15 an 16 are similar to the DSC plots of FIGS. 13 and 14 in that they show DSC plots for blends of LDPE and LLDPE in accordance with the invention. However, the LLDPE of FIGS. 13 and 14 is obtained by recycling an irradiated shrink film. Densities of from 0.7 to less than about 7 pcf (11 to 112 kg/cubic meter) can be achieved for foams produced from recycled shrink film. Shrink film that is irradiated and substantially gel free provides a convenient source of resin having a reduced melt index. Typically, the melt index has been reduced by 20 to about 98% or more. Polyethylenic films that have not been irradiated should be subjected to irradiation in accordance with the invention, either before or after preparation for use in an extruder or other foaming means.

Figure 16:
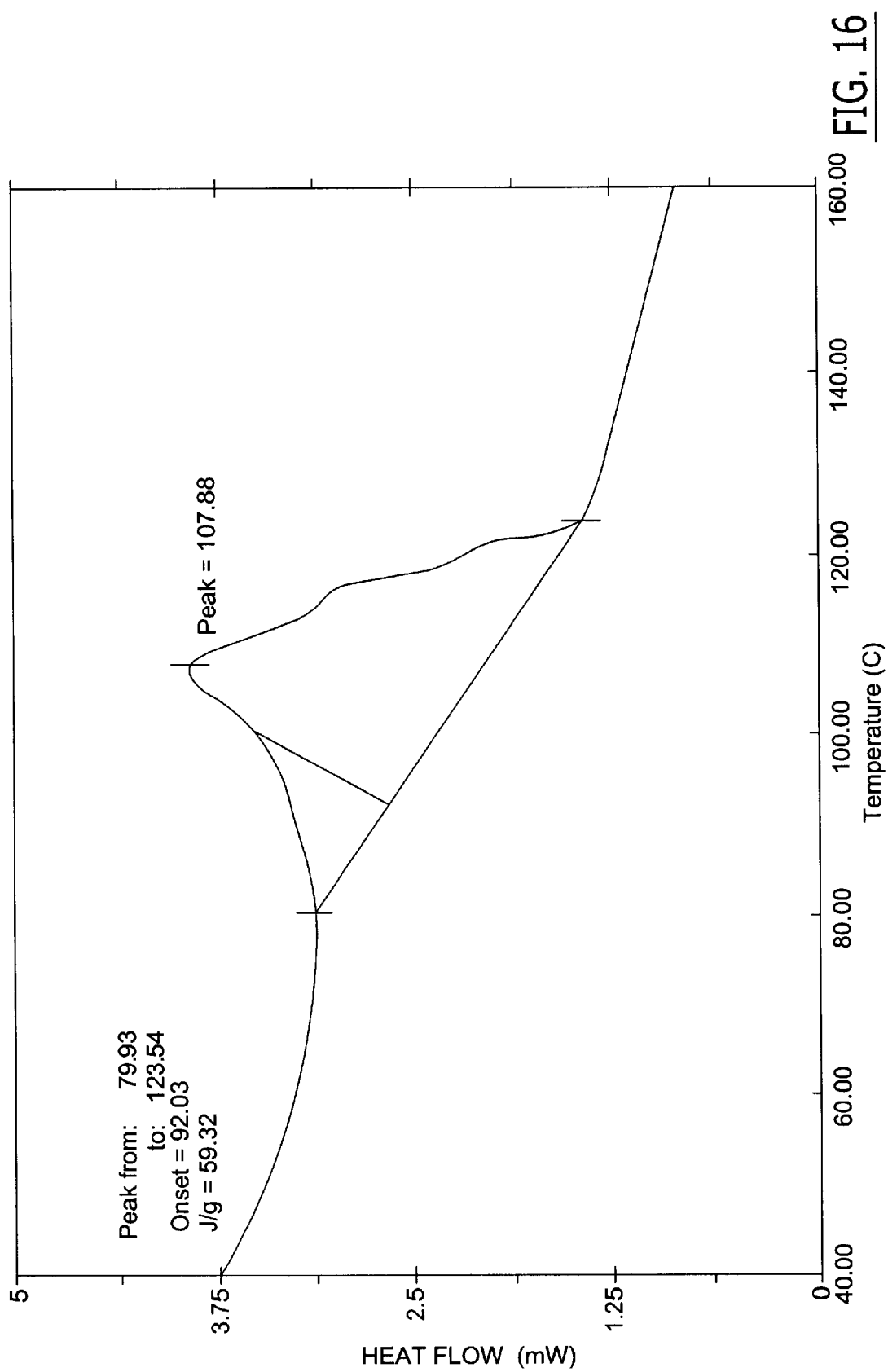

The resin from the film is used to obtain the plots of FIGS. 15 and 16 in concentrations of from 10% to 30% by weight of the resin, respectively, although up to 60% of the resin can be used to produce good quality foam from recycled film. A typical resin at 60% concentration comprises about 40% by weight LDPE and 44% LLDPE, 8% EVA, and 8% LMDPE. The results are similar to those shown in FIGS. 13 and 14 for blends of LDPE and irradiated LLDPE, in that a single broad peak is shown. Other ethylenic polymer films should be useful for the practice of the invention. These films may be prepared from ethylenic polymers selected from polyethylenes, including LDPE and linear polyethylenes; copolymers or terpolymers of ethylene monomers or oligomers and one or more alpha-olefins; copolymers and terpolymers of ethylene monomers or oligomers and monomers or oligomers selected from the group consisting of vinyl acetate, methyl methacrylate, maleic anhydride, acrylonitrile, isoprene, styrene, acrylic acid, and ionic salts of acrylic acid; and blends of one or more thereof.

The polyethylene resins include high density polyethylene (HDPE), ultra-high density polyethylene (UHDPE), linear medium density polyethylene (LMDPE), linear low density polyethylene (LLDPE), very low density polyethylene (VLDPE), ultra-low density polyethylene (ULDPE), metallocene polyethylene (mPE), which is produced from metallocene catalyzed polymerization. The alpha-olefins normally have from 3 to 20 carbon atoms in the chain and include propene, 1-butene, 1-pentene, 1-hexene, 1-octene, methyl pentene, and the like. Also included are various ethlyenic copolymers including, but not limited to, ethylene monomers or oligomers copolymerized or block polymerized with vinyl acetate (ethylene vinyl acetate or EVA); methyl methacrylate; maleic anhydride; acrylonitrile; alpha-olefins including propylene, butylene, methyl pentene; isoprene; styrene; acrylic acid; and ionic salts of acrylic acid (ionomers).

Recycled film and its use in the preparation of foams is discussed in the following Examples.

EXAMPLES

The following examples illustrate the use of the recycled shrink wrap film discussed in connection with FIGS. 15 and 16 as the source of irradiated LLDPE polymer for use in the practice of the invention. The recycled shrink film had a three-layer coextruded composite structure, containing 74% linear low density polyethylene (LLDPE), 13% linear medium density polyethylene (LMDPE), and 12.4% ethylene vinyl acetate (EVA): LLDPE+LMDPE+EVA/LLDPE/LLDPE+LMDPE+EVA. This film is described in U.S. Pat. Nos. 4,551,380 and 4,643,943. The film had previously been irradiated at 2.3 to 3.0 Mrads. Before irradiation, the coextruded film had an overall melt index of 1.0 and a heavy weight melt index of 33.9 under a weight of 21.6 kg. After the film was irradiated, the film had an overall melt index of less than 0.1 and a heavy weight melt index of 1.3 under the same weight. The film was pelletized to facilitate feeding to foam extruder. It is called "shrink film" in the following examples.

Example 1

Foam sheet was prepared on a tandem extrusion system having a first or primary extruder of 11.4 cm diameter and a second, or secondary, extruder of 15.2 cm diameter. The blowing agent was propane. Talc and fatty acid (glycerol monostearate) were added for control of cell nucleation and dimensional stability. The results comparing 100% LDPE foam and various proportions of resin from shrink film added to the LDPE resin in amounts of from 15 to 50% by weight of the resin are presented in Table 1 below:

TABLE 1

|  | 1 | 2 | 3 | 4 | 5 |
|---|---|---|---|---|---|
| LDPE, wt % | 100 | 85 | 75 | 65 | 50 |
| Shrink Film wt % | 0 | 15 | 25 | 35 | 50 |
| Total rate Kg/hr | 312 | 321 | 300 | 295 | — |
| Propane Kg/hr | 35.5 | 39 | 41 | — | 41 |
| Melt T.° C. | 108 | 113 | 115 | 114 | — |
| Die P. Mpa | 9 | 8.4 | 8.0 | 7.5 | 7.8 |
| Thickness, mm | 3.5 | 3.2 | 2.9 | 3.1 | 2.6 |
| Density, Kg/m$^3$ | 18 | 21 | 22 | 18 | 22 |
| Cells, MD #/cm | 12 | 10 | 11 | 12 | 14 |
| TD | 11 | 11 | 12 | 13 | 16 |
| Tear Strength |  |  |  |  |  |
| lb/in, MD | 7.4 | 11.3 | 13 | 9 | 14 |
| TD | 11 | 13 | 14 | 13 | 17 |
| Tensile, lb/in$^2$ MD | 52 | 53 | 61 | 49 | 67 |
| TD | 28 | 36 | 38 | 34 | 44 |
| Puncture, lb | 6.3 | 7.0 | 7.2 | 7.2 | 7.0 |

As is shown from the table above, tear strength, tensile, and puncture resistance of the thin sheet extruded foam prepared from a mixture of LDPE and LLDPE from recycled shrink wrap film were comparable or increased over that for foam of comparable thickness and density prepared from a 100% LDPE resin.

Example 2

Foam sheet was prepared on a tandem extrusion system having a first extruder of 8.9 cm diameter and a second extruder of 11.4 cm diameter. The blowing agent was propane. Talc and fatty acid (glycerol monostearate) were added for control of cell nucleation and dimensional stability. The total resin flow rate was 248 kg/hr. The results comparing 100% LDPE foam and various proportions of resin from shrink film added to the LDPE resin in amounts of from 5 to 20% by weight of the resin are presented in Table 2 below.

TABLE 2

|  | 1 | 2 | 3 | 4 |
|---|---|---|---|---|
| LDPE wt % | 100 | 85 | 85 | 80 |
| Shrink film wt % | 0 | 5 | 15 | 20 |
| Propane | — | 35.5 | 36.8 | 38.2 |
| Melt T.° C. | 110 | 110 | 112 | 113 |
| Die P. MPa | — | 5.9 | 6.1 | 5.5 |
| Thickness, mm | 2.6 | 2.5 | 7.5 | 2.4 |
| Density, Kg/m³ | 17.6 | 17.6 | 19.2 | 19.2 |
| Tear Strength |  |  |  |  |
| lb/In, MD | 5.6 | 7 | 8 | 8 |
| TD | 10 | 10 | 11 | 12 |

Table 2 shows comparable or improved tear strength for thin sheet extruded foam prepared from a mixture of LDPE and LLDPE from recycled shrink wrap film when compared to foam from 100% LDPE resin of similar thickness and density.

Example 3

Foam rod was prepared on a 90 mm diameter counter-rotating twin screw extruder with a rod die. The blowing agent was isobutane. The pressure was taken right before the die. The results comparing 100% LDPE foam and various proportions of resin from shrink film added to the LDPE resin are presented in Table 3 below.

TABLE 3

|  | LDPE Kg/hr | Shrink Film kg/hr | Butane kg/hr | Screw RPM | Pressure MPa | Melt T. ° C. | Rod Dia. cm | Density kg/m³ |
|---|---|---|---|---|---|---|---|---|
| 1. | 68.2 | — | 6.6 | 34 | 3.46 | 112.8 | 7.6 | 28.6 |
| 2. | 64.8 | 3.4 | 6.4 | 44 | 2.72 | 117.2 | 6.8 | 32.2 |
| 3. | 61.4 | 6.8 | 6.4 | 44 | — | 120 | — | 37.3 |
| 4. | 54.6 | 13.6 | 6.4 | 40 | 3.88 | 122.2 | 6.8 | 37.3 |
| 5. | 47.8 | 20.4 | 6.5 | 35 | 5.17 | 127.2 | 6.8 | 30.1 |
| 6. | 37.5 | 30.7 | 6.5 | 35 | 5.92 | 121.1 | 6.7 | 30.2 |
| 7.* | 28.6 | 39.6 | 6.5 | 37 | 6.19 | 123.3 | 6.1 | 33 |

*Early sample, the process became too hot to make a decent sample later.

Table 3 shows that foam rods of comparable density were prepared from 100% LDPE resin and from LDPE resin having various amounts of LLDPE resin from shrink film admixed therewith.

Although the foregoing invention has been described in some detail by way of illustration and example for purposes of clarity of understanding, and although specific terms have been employed, these terms have been used in a generic and descriptive sense only and not for purposes of limitation.

What is claimed is:

1. An ethylenic polymer foam product having a density of from about 0.7 to less than 8 pcf (about 11 to 128 kg/cubic meter) comprising one or more ethylenic polymers selected from the group consisting of polyethylenes other than low density polyethylene (LDPE); copolymers or terpolymers of ethylene monomers or oligomers and one or more alpha-olefins; copolymers and terpolymers of ethylene monomers or oligomers and monomers or oligomers selected from the group consisting of vinyl acetate, methyl methacrylate, maleic anhydride, acrylonitrile, isoprene, styrene, acrylic acid, and ionic salts of acrylic acid; blends thereof; and blends thereof with LDPE, wherein said ethylenic polymers other than LDPE are irradiated polymers having a gel content of less than 5% by weight.

2. The product of claim 1 wherein said ethylenic polymers are selected from the group consisting of ultra high density polyethylene (UHDPE), high density polyethylene (HDPE), linear low density polyethylene (LLDPE), linear medium density polyethylene (LMDPE), very low density polyethylene (VLDPE), ultra low density polyethylene (ULDPE), and metallocene polyethylene (mPE), and ethylene vinyl acetate copolymer.

3. The product of claim 1 wherein said irradiated ethylenic polymer is substantially gel free.

4. The product of claim 3 wherein said alpha-olefin is selected from the group consisting of propene, 1-butene, 1-pentene, 1-hexene, 1-octene, methyl pentene, propylene, butylene, and methyl pentene.

5. The product of claim 1 wherein said irradiated ethylenic polymer is compatible with LDPE and in admixture therewith exhibits a single melting temperature range for each blend as determined by differential scanning calorimetry at a sample rate of about 10° C. per minute for about a 5 mg sample.

6. The product of claim 1 wherein said irradiated ethylenic polymer has a melt index of at least about 20% less than the same polymer prior to irradiation.

7. The product of claim 1 wherein said irradiated ethylenic polymer has an extensional viscosity at least about 200% greater than the same polymer prior to irradiation.

8. The product of claim 1 wherein said irradiated ethylenic polymer has an extensional viscosity at least about 250% greater than the same polymer prior to irradiation.

9. The product of claim 1 wherein said irradiated ethylenic polymer has an extensional viscosity at least about 350% greater than the same polymer prior to irradiation.

10. The product of claim 1 wherein said blend including LDPE is irradiated.

11. The product of claim 1 wherein said ethylenic polymers are irradiated in an atmosphere in which the active oxygen concentration is at least 15% by volume of the atmosphere.

12. The product of claim 1 wherein said ethylenic polymers are irradiated in air at ambient temperature conditions.

13. The product of claim 1 wherein said product has a flexural modulus exceeding at least about 500 psi at 2 pcf to about 1,200 psi at 5 pcf, said flexural modulus increasing substantially linearly with density.

14. The product of claim 1 wherein the tear resistance in the cross direction is within 25% of the tear resistance in the machine direction.

15. The product of claim 14 wherein said ethylenic polymer is linear low density polyethylene.

16. The product of claim 1 wherein the tear resistance in the machine direction exceeds from about 8 lbs/in of foam at 1 pcf to about 16 lbs/in at 2 pcf and increases linearly with density.

17. The product of claim 1 wherein the product has a tear strength at a given density that is from 10 to 100% greater than the tear strength of a closed cell expanded polyethylene of the same density consisting of LDPE.

18. The product of claim 1 further comprising ethylenic polymers other than LDPE that have not been irradiated prior to foaming.

19. The product of claim 1 wherein said ethylenic polymer has a melt index of at least 0.3.

20. The product of claim 1 wherein said density is from about 0.7 to 6 pcf (11 to 96 kg/cubic meter).

21. The product of claim 1 wherein said density is from about 0.7 to less than 4 pcf (11 to 64 kg/cubic meter).

22. The product of claim 1 wherein said foam is prepared from one or more ethylenic polymers in the absence of LDPE and said density is from about 2 pcf to less than 4 pcf (32 to 64 kg/cubic meter).

23. The product of claim 1 wherein said product is a blend of from about 5 to 100% by weight irradiated HDPE and from 0 to 95% by weight LDPE.

24. The product of claim 1 wherein said ethylenic polymer is ethylene vinyl acetate.

25. The product of claim 1 wherein said product is a single stage extruded closed-cell foam having at least about 80% closed cells.

* * * * *

UNITED STATES PATENT AND TRADEMARK OFFICE
CERTIFICATE OF CORRECTION

PATENT NO.    : 6,593,386 B1                                        Page 1 of 1
DATED         : July 15, 2003
INVENTOR(S)   : Malwitz et al.

It is certified that error appears in the above-identified patent and that said Letters Patent is hereby corrected as shown below:

<u>Title page, Item [54] and Column 1, line 1,</u>
Title, "COMPITABLE" should read -- COMPATIBLE --.

<u>Column 7,</u>
Footnote following TABLE 1, "polymec" should read -- polymer --.

Signed and Sealed this

Thirtieth Day of September, 2003

JAMES E. ROGAN
*Director of the United States Patent and Trademark Office*